United States Patent
Kolze et al.

(10) Patent No.: US 7,599,423 B2
(45) Date of Patent: *Oct. 6, 2009

(54) SUCCESSIVE INTERFERENCE CANCELING FOR CDMA

(75) Inventors: Thomas J. Kolze, Phoenix, AZ (US); Nabil R. Yousef, Foothill Ranch, CA (US)

(73) Assignee: Broadcom Corporation, Irvine, CA (US)

(*) Notice: Subject to any disclaimer, the term of this patent is extended or adjusted under 35 U.S.C. 154(b) by 387 days.

This patent is subject to a terminal disclaimer.

(21) Appl. No.: 11/604,483

(22) Filed: Nov. 27, 2006

(65) Prior Publication Data

US 2007/0140321 A1 Jun. 21, 2007

Related U.S. Application Data

(63) Continuation of application No. 10/242,032, filed on Sep. 12, 2002, now Pat. No. 7,190,710, which is a continuation-in-part of application No. 10/136,059, filed on Apr. 30, 2002, now Pat. No. 7,236,545, which is a continuation-in-part of application No. 10/000,415, filed on Nov. 2, 2001, now Pat. No. 7,308,050.

(60) Provisional application No. 60/296,884, filed on Jun. 8, 2001, provisional application No. 60/394,893, filed on Jul. 10, 2002.

(51) Int. Cl.
*H04B 1/69* (2006.01)
*H04B 1/707* (2006.01)
*H04B 1/713* (2006.01)

(52) U.S. Cl. ...................... 375/148; 375/144; 375/346; 375/350; 375/232

(58) Field of Classification Search ................ 375/148, 375/144, 345, 349, 350, 232, 147, 150, 343; 370/335, 342, 441, 479
See application file for complete search history.

(56) References Cited

U.S. PATENT DOCUMENTS

| | | | | |
|---|---|---|---|---|
| 5,467,368 A | * | 11/1995 | Takeuchi et al. | ............ 375/148 |
| 5,719,852 A | * | 2/1998 | Schilling et al. | ............ 370/201 |
| 6,088,383 A | * | 7/2000 | Suzuki et al. | ............... 375/148 |
| 6,363,103 B1 | * | 3/2002 | Buehrer et al. | .............. 375/148 |
| 7,190,710 B2 | * | 3/2007 | Yousef et al. | ............... 375/148 |

* cited by examiner

*Primary Examiner*—Phuong Phu
(74) *Attorney, Agent, or Firm*—Garlick Harrison & Markison; Shayne X. Short

(57) ABSTRACT

Successive interference canceling for CDMA. ICI may result from a signal's multi-path effects, or by filtering/suppression of some of the component energy of the signaling waveforms. Energy component attenuation destroys orthogonality of CDMA symbols thereby causing ICI. An ICF suppresses frequency domain portions(attenuates ingress), but also introduces ICI. Following the ICF, the signal is de-spread sliced, re-spread and convolved with the ICF echoes (except first tap echoes). Convolving re-spread hard decisions with delayed ICF taps is equivalent to partially re-modulating the first-pass hard decisions to efficiently "add-back-in" the signal energy which was blanked/subtracted by the ICF. Alternatively, parameter estimation de-rotates and re-rotates soft symbols and hard decisions, respectively, compensating for undesirable symbol rotation. The convolved signal is subtracted from a delayed version of the ICF output signal. If desired, this process may be repeated successively to enhance the accuracy of the obtained data decisions in the next stage.

20 Claims, 25 Drawing Sheets

SIC Funtionality for CDMA 1400 (Parallel Implementation)

Cellular Communication System 300

Satellite Communication System 500

Microwave Communication System 600

High Definition Television (HDTV) Communication System 800

Communication System 1000

Bluetooth™ Communication System 1300

SIC Funtionality for CDMA 1400 (Parallel Implementation)

SIC Funtionality for CDMA 1500 (Serial Implementation)

Rotation Effects on QPSK Constellation

Rotation Effects on 8 PSK Constellation

Rotation Effects on 16 QAM Constellation

SIC Funtionality for CDMA 2000 (Parallel Implementation) Compensating for Rotation Fig. 21 SIC Funtionality for CDMA 2100 (Serial Implementation) Compensating for Rotation Fig. 22 SIC Method for CDMA 2200

SIC Method for CDMA 2300

SIC for CDMA Simulation Results 2500

SUCCESSIVE INTERFERENCE CANCELING FOR CDMA

CROSS REFERENCE TO RELATED PATENTS/PATENT APPLICATIONS

Continuation Priority Claim, 35 U.S.C. §120

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility Application Ser. No. 10/242,032, entitled "SUCCESSIVE 10 INTERFERENCE CANCELING FOR CDMA," filed Sept. 12, 2002, now U.S. Pat. No. 7,190,710 B2, issued on Mar. 13, 2007.

Parent's CIP and Provisional Priority Claims, 35 U.S.C. §120, 119(e)

The U.S. Utility application Ser. No. 10/242,032 claims priority pursuant to 35 U.S.C. §119(e) to the following U.S. Provisional Patent Application which is hereby incorporated herein by reference in its entirety and made part of the present U.S. Utility Patent Application for all purposes:

2. U.S. Provisional Application Ser. No. 60/394,893, entitled "SUCCESSIVE INTERFERENCE CANCELING FOR CDMA," filed Jul. 10, 2002; and The U.S. Utility application Ser. No. 10/242,032 also claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

3. U.S. Utility application Ser. No. 10/136,059, entitled "CHIP BLANKING AND PROCESSING IN S-CDMA TO MITIGATE IMPULSE AND BURST NOISE AND/OR DISTORTION," filed Apr. 30, 2002, pending, which claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

4. U.S. Utility application Ser. No. 10/000,415, entitled "Detection and mitigation of temporary impairments in a communications channel,", filed Nov. 2, 2001, pending, which claims priority pursuant to 35 U.S.C. §119(e) to the following U.S. Provisional Patent Application which is hereby incorporated herein by reference in its entirety and made part of the present U.S. Utility Patent Application for all purposes:

5. U.S. Provisional Application Ser. No. 60/296,884, entitled "Detection and mitigation of temporary impairments in a communications channel," filed Jun. 08, 2001.

BACKGROUND OF THE INVENTION

1. Technical Field of the Invention

The invention relates generally to communication systems; and, more particularly, it relates to communication receivers employing Code Division Multiple Access (CDMA).

2. Description of Related Art

Data communication systems have been under continual development for many years. One particular type of communication system, a cable modem (CM) communication system, has been under continual development for the last several years. There has been development to try to provide for improvements in the manner in which communications between the CM users and a cable modem termination system (CMTS) is performed. Many of these prior art approaches seek to perform and provide broadband network access to a number of CM users.

CM communication systems are realized when a cable company offers network access, oftentimes Internet access, over the cable. This way, the Internet information can use the same cables because the CM communication system puts downstream data, sent from the Internet to an individual computer having CM functionality, into a communication channel having a 6 MHz capacity. The reverse transmission is typically referred to as upstream data, information sent from an individual back to the Internet, and this typically requires even less of the cable's bandwidth. Some estimates say only 2 MHz are required for the upstream data transmission, since the assumption is that most people download far more information than they upload.

Putting both upstream and downstream data on the cable television system requires two types of equipment: a cable modem on the customer end and the CMTS at the cable provider's end. Between these two types of equipment, all the computer networking, security and management of Internet access over cable television is put into place. This intervening region may be referred to as a CM network segment, and a variety of problems can occur to signals sent across this CM network segment.

One particular deficiency that may arise in this CM network segment is the introduction of multi-path effects where there is interference from one symbol to another in a delayed, scaled form. For example, a scaled and delayed version of one symbol is undesirably added to other symbols. This can lead to significant degradation in performance. In CDMA systems, these multi-path effects can be totally deficient, in that, it may make accurate decoding of the transmitted data virtually impossible. A number of sources may create these multi-path effects, including the communication channel itself, as well as notch filters and interference canceling filters within a communication receiver that may seek to minimize the deleterious effects of a communication channel.

In synchronous code division multiple access (S-CDMA) systems, several cable modems (CMs) transmit their signals such that these signals are received at the CMTS on the same frequency and at the same time. In order for different CM signals to be separated at the CMTS, each CM spreads its data sequence by a code sequence of wider spectrum. The CMTS receives the sum of all CM signals. To separate a specific CM signal, the CMTS despreads the received sequence by multiplying it with the code sequence of the desired CM.

In order to minimize the inter-code-interference (ICI), the spreading codes are chosen such that they are perfectly orthogonal, when they are received in perfect synchronism. In order to guarantee code orthogonality, the code sequences are often chosen to have cyclic-shift properties. To preserve the code orthogonality at the CMTS, transmit equalizers are used by CMs to guarantee a perfect single-path overall channel seen at the CMTS. The transmit equalizer taps at a specific CM are usually set according to an estimate of the channel between the CM and CMTS, which is estimated during the ranging process.

In many cases, the received signal at the CMTS is corrupted with strong narrow-band interference (or ingress). An interference canceling filter (ICF) is used to notch out ingress before signal despreading. Although this ICF can mitigate ingress, it can cause considerable performance degradation, which can be explained as follows. The ICF taps cause intersymbol-interference (ISI) as they can be viewed as echoes to the signal. These echoes result in shifted (or delayed) replica of the received signal at the CMTS side. This enhances ICI as codes loose their perfect orthogonality. Moreover, due to the cyclic-shift properties of the used orthogonal codes, a shifted replica of one code might resemble another code to a great extent, which enhances the ICI significantly. The same effect can also be caused by imperfections in the channel estimation ranging process, possible channel variations, as well as the finite length and precision of the transmit equalizers, all of which can result in residual echoes in the overall channel seen at the CMTS. The problems described herein may arise within a variety of contexts, including both wireless and wired communication systems.

The effect of ISI in CDMA systems can be extremely problematic and is typically very severe in its magnitude and nature. Because the neighboring codes are typically orthogonal to one another, the ISI look very similar to delayed (shifted and scaled) versions of one another. This interference can be highly correlated and very problematic.

Within Time Division Multiple Access (TDMA) communication systems, a common approach to deal with ISI is to employ a Decision Feedback Equalizer (DFE) type structure. This DFE structure can compensate for interference that takes the form described above that is delayed by at least one symbol. For example, before decoding a second symbol in TDMA using DFE, a scaled version of the first symbol is subtracted there form. The scaling is based on the determined characterization of the ISI that is attributed to the second symbol from the first symbol.

Within the CDMA context, there is no such way known in the prior art to deal with these effects of multi-path and ISI is a satisfactory way. In the CDMA context, a signal is spread out over a number of chips. Here, the ISI will vary on a chip by chip basis. When narrowband interference is undesirably added to these various chips it makes the decoding of the signal nearly impossible. This is because all of the chips need to be received to perform the soft decisions that are used later to make hard decisions there from. For example, in an embodiment where N chips are used to perform symbol decisions, then all of the 128 chips are needed to N chips need to be received before making the symbol decisions of the symbols contained and coded therein. The interference between these chips will be non-causal in the CDMA context. The very manner in which a CDMA receiver performs decoding of its signals is what makes it impossible to use a DFE type structure (as in TDMA) to perform the decoding. Within CDMA, a clean representation of all of the chips must be achieved. The very way that a CDMA signal is received will inherently include (in the existence of ISI on the chip level) of one clean chip with the remaining chips having the ISI. Since CDMA does not decode a single chip at a time (whereas TDMA may decode a single symbol at a time), this need to decode all of the chips together over a relatively long period of time, for many codes, and sum over all of those codes to decode each symbol. Basically, the fact that, in CDMA, many symbols are all decoded at the same time, there is a need for a clean representation of all of the chips of a received signal.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
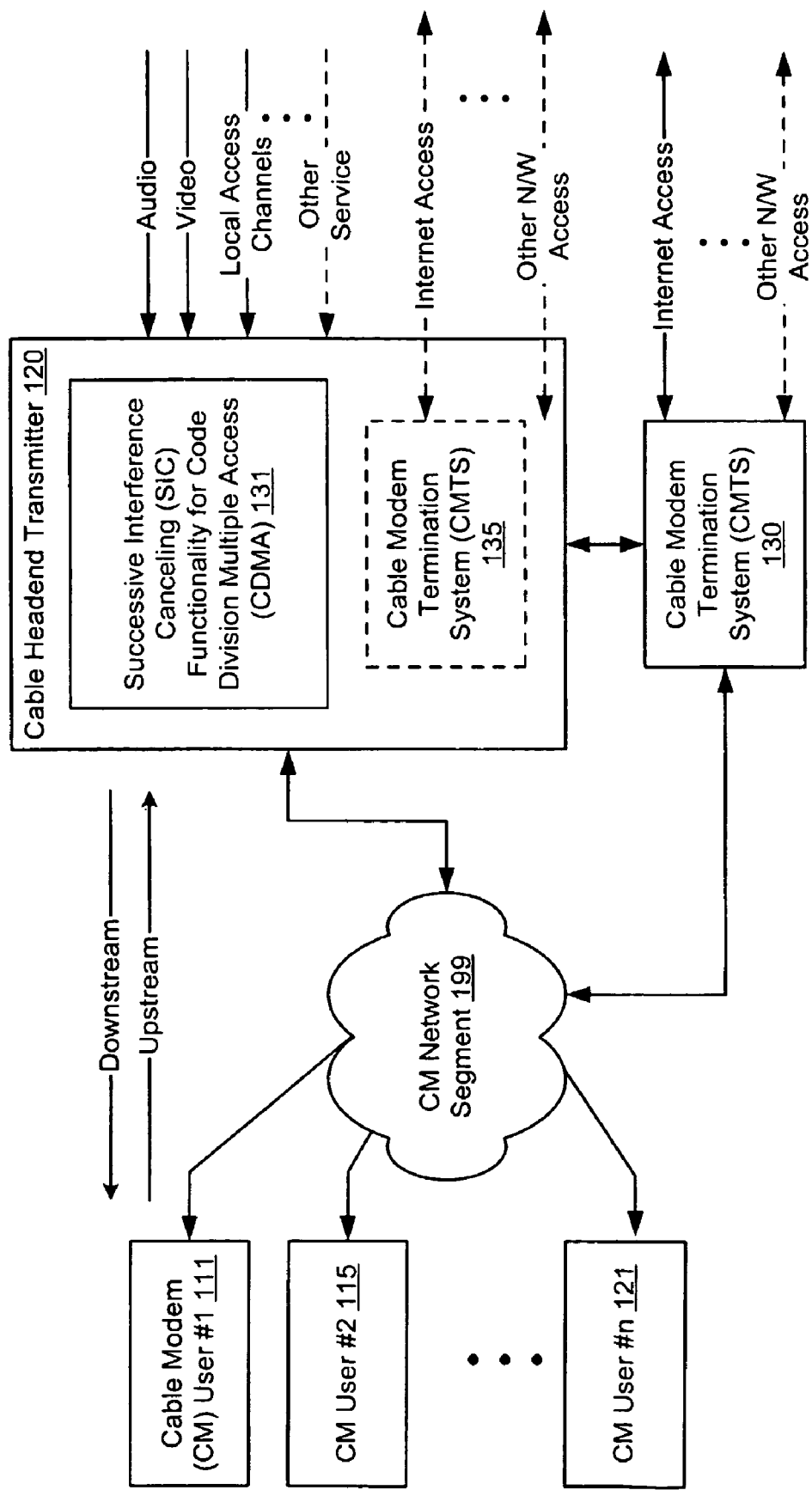
FIG. 1 is a system diagram illustrating an embodiment of a cable modem (CM) communication system that is built according to the invention.

FIG. 1 is a system diagram illustrating an embodiment of a CM communication system 100 that is built according to the invention. The CM communication system includes a number of CMs (shown as being used by a CM user #1 111, a CM user #2 115, . . . , and a CM user #n 121) and a CMTS 130. The CMTS 130 is a component that exchanges digital signals with CMs on a cable network.

Each of a number of CM users (shown as the CM user #1 111, the CM user #2 115, . . . , and the CM user #n 121) is operable to communicatively couple to a CM network segment 199. A number of elements may be included within the CM network segment 199. For example, routers, splitters, couplers, relays, and amplifiers may be contained within the CM network segment 199 without departing from the scope and spirit of the invention.

The CM network segment 199 allows communicative coupling between a CM user and a cable headend transmitter 120 and/or a CMTS 130. In some embodiments, a cable CMTS is in fact contained within a headend transmitter. In other embodiments, a cable CMTS is located externally with respect to a headend transmitter. For example, the CMTS 130 may be located externally to the cable headend transmitter 120. In alternative embodiments, a CMTS 135 may be located within the cable headend transmitter 120. The CMTS 130 may be located at a local office of a cable television company or at another location within a CM communication system. In the following description, the CMTS 130 is used for illustration; yet, the same functionality and capability as described for the CMTS 130 may equally apply to embodiments that alternatively employ the CMTS 135. The cable headend transmitter 120 is able to provide a number of services including those of audio, video, local access channels, as well as any other service known in the art of cable systems. Each of these services may be provided to the one or more CM users 111, 115, . . . , 121.

In addition, through the CMTS 130, the CM users 111, 115, . . . , 121 are able to transmit and receive data from the Internet, . . . , and/or any other network to which the CMTS 130 is communicatively coupled. The operation of a CMTS, at the cable-provider's head-end, may be viewed as providing analogous functions provided by a digital subscriber line access multiplexor (DSLAM) within a digital subscriber line (DSL) system. The CMTS 130 takes the traffic coming in from a group of customers on a single channel and routes it to an Internet Service Provider (ISP) for connection to the Internet, as shown via the Internet access. At the head-end, the cable providers will have, or lease space for a third-party ISP to have, servers for accounting and logging, dynamic host configuration protocol (DHCP) for assigning and administering the Internet protocol (IP) addresses of all the cable system's users (CM users 111, 115, . . . , 121), and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (EuroDOCSIS), the major standard used by European cable systems in providing Internet access to users, without departing from the scope and spirit of the invention.

The downstream information flows to all of the connected CM users 111, 115, . . . , 121. The individual network connection, within the CM network segment 199, decides whether a particular block of data is intended for it or not. On the upstream side, information is sent from the CM users 111, 115, . . . , 121 to the CMTS 130; on this upstream transmission, the users within the CM users 111, 115, . . . , 121 to whom the data is not intended do not see that data at all. As an example of the capabilities provided by a CMTS, the CMTS will enable as many as 1,000 users to connect to the Internet through a single 6 MHz channel. Since a single channel is capable of 30-40 megabits per second of total throughput, this means that users may see far better performance than is available with standard dial-up modems. Some embodiments implementing the invention are described below and in the various Figures that show the data handling and control within one or both of a CM and a CMTS within a CM system that operates by employing S-CDMA (Synchronous Code Division Multiple Access).

The CM users 111, 115, . . . , 121 and the CMTS 130 communicate synchronization information to one another to ensure proper alignment of transmission from the CM users 111, 115, . . . , 121 to the CMTS 130. This is where the synchronization of the S-CDMA communication systems is extremely important. When a number of the CMs all transmit their signals at a same time such that these signals are received at the CMTS 130 on the same frequency and at the same time, they must all be able to be properly de-spread and decoded for proper signal processing.

Each of the CMs users 111, 115, . . . , 121 is located a respective transmit distance from the CMTS 130. In order to achieve optimum spreading diversity and orthogonality for the CMs users 111, 115, . . . , 121 to transmission of the CMTS 130, each of the CM transmissions must be synchronized so that it arrives, from the perspective of the CMTS 130, synchronous with other CM transmissions. In order to achieve this goal, for a particular transmission cycle, each of the CMs 111, 115, . . . , 121 will typically transmit to the CMTS 130 at a respective transmission time, which will likely differ from the transmission times of other CMs. These differing transmission times will be based upon the relative transmission distance between the CM and the CMTS 130. These operations may be supported by the determination of the round trip delays (RTPs) between the CMTS 130 and each supported CM. With these RTPs determined, the CMs may then determine at what point to transmit their S-CDMA data so that all CM transmissions will arrive synchronously at the CMTS 130.

The invention enables successive interference canceling. (SIC) functionality for CDMA within the CMTS 130. This SIC functionality for CDMA is shown as within a functional block 131 within the cable headend transmitter 120. This SIC functionality for CDMA may also be supported within the CMTS 135 and/or the CMTS 130, whichever may be implemented within a particular embodiment. All of the functionality described herein this patent application may be performed within the context of the CM communication system of the FIG. 1. The FIG. 1 shows just one embodiment where the various aspects of the invention may be implemented. Several other embodiments are described as well.

Figure 2:
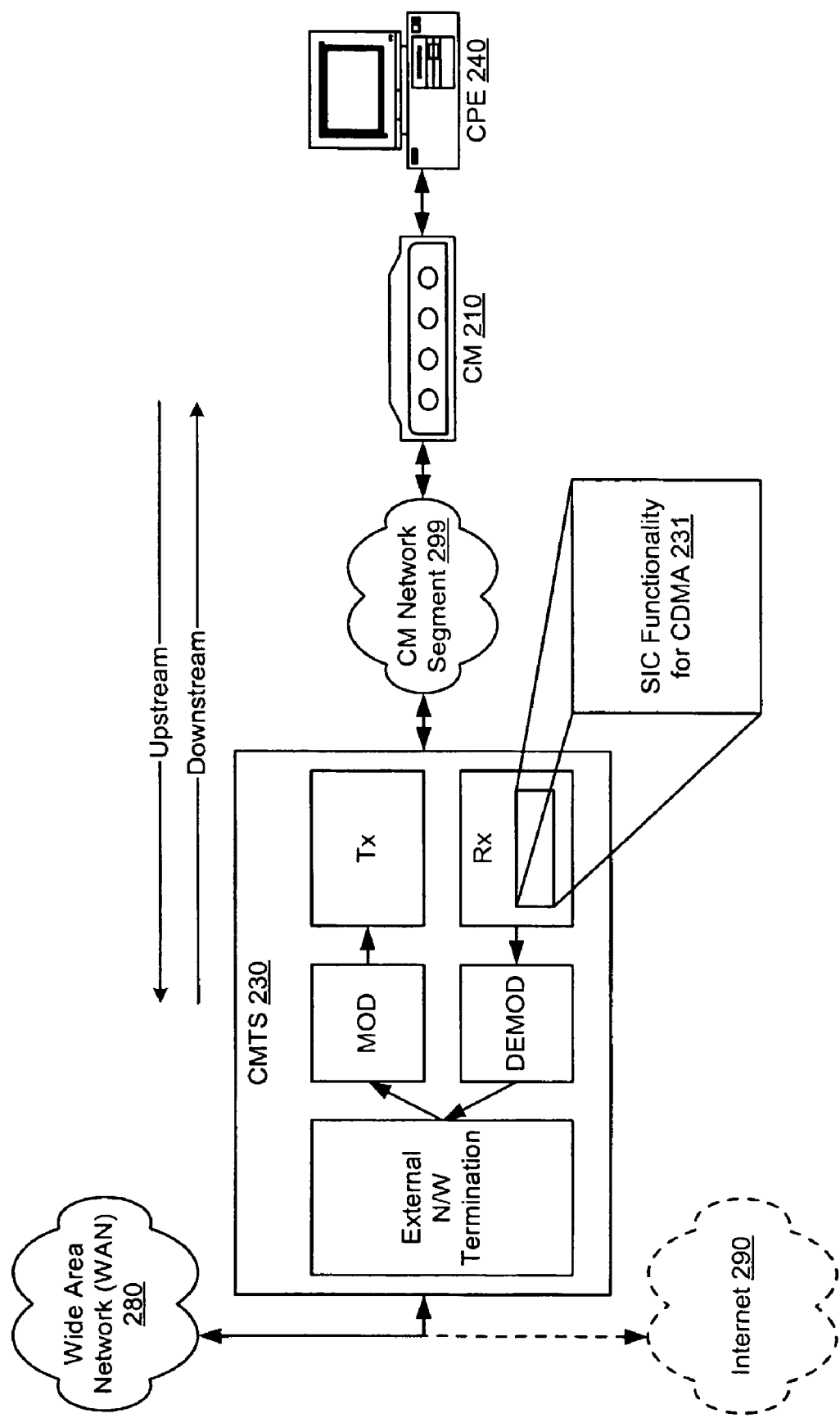
FIG. 2 is a system diagram illustrating another embodiment of a CM communication system that is built according to the invention.

FIG. 2 is a system diagram illustrating another embodiment of a CM communication system 200 that is built according to the invention. From certain perspectives, the FIG. 2 may be viewed as a communication system allowing bi-directional communication between a customer premise equipment (CPE) 240 and a network. In some embodiments, the CPE 240 is a personal computer or some other device allowing a user to access an external network. The external network may be a wide area network (WAN) 280, or alternatively, the Internet 290 itself. For example, the CM communication system 200 is operable to allow Internet protocol (IP) traffic to achieve transparent bi-directional transfer between a CMTS-network side interface (CMTS-NSI: viewed as being between the CMTS 230 and the Internet 290) and a CM to CPE interface (CMCI: viewed as being between the CM 210 and the CPE 240).

The WAN 280, and/or the Internet 290, is/are communicatively coupled to the CMTS 230 via the CMTS-NSI. The CMTS 230 is operable to support the external network termination, for one or both of the WAN 280 and the Internet 290. The CMTS 230 includes a modulator and a demodulator to support transmitter and receiver functionality to and from a CM network segment 299. The receiver functionality within the CMTS 230 is operable to support SIC functionality for CDMA 231 according to the invention.

A number of elements may be included within the CM network segment 299. For example, routers, splitters, couplers, relays, and amplifiers may be contained within the CM network segment 299 without departing from the scope and spirit of the invention. The CM network segment 299 allows communicative coupling between a CM user and the CMTS 230.

Figure 3:
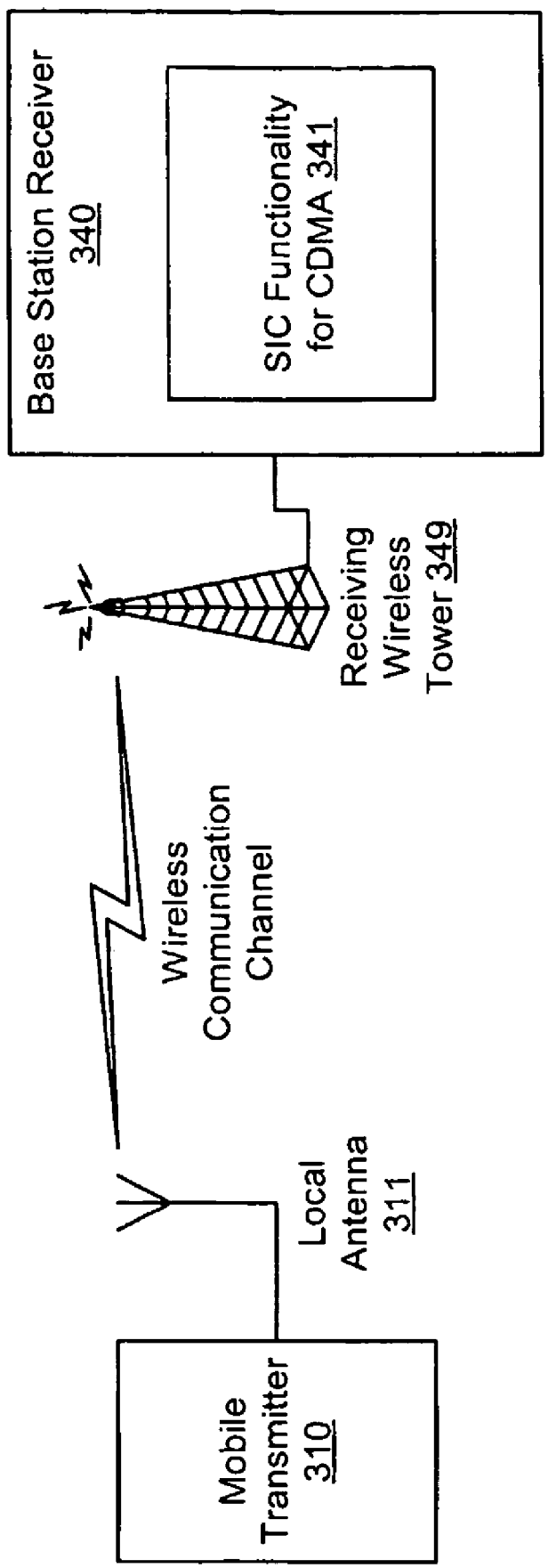
FIG. 3 is a system diagram illustrating an embodiment of a cellular communication system that is built according to the invention.

FIG. 3 is a system diagram illustrating an embodiment of a cellular communication system 300 that is built according to the invention. A mobile transmitter 310 has a local antenna 311. The mobile transmitter 310 may be any number of types of transmitters including a cellular telephone, a wireless pager unit, a mobile computer having transmit functionality, or any other type of mobile transmitter. The mobile transmitter 310 transmits a signal, using its local antenna 311, to a base station receiver 340 via a wireless communication channel. The base station receiver 340 is communicatively coupled to a receiving wireless tower 349 to be able to receive transmission from the local antenna 311 of the mobile transmitter 310 that have been communicated via the wireless communication channel. The receiving wireless tower 349 communicatively couples the received signal to the base station receiver 340.

The base station receiver 340 is then able to support SIC functionality for CDMA according to the invention, as shown in a functional block 341, on the received signal. The FIG. 3 shows just one of many embodiments where SIC functionality for CDMA, performed according to the invention, may be performed to provide for improved operation within a communication system.

Figure 4:
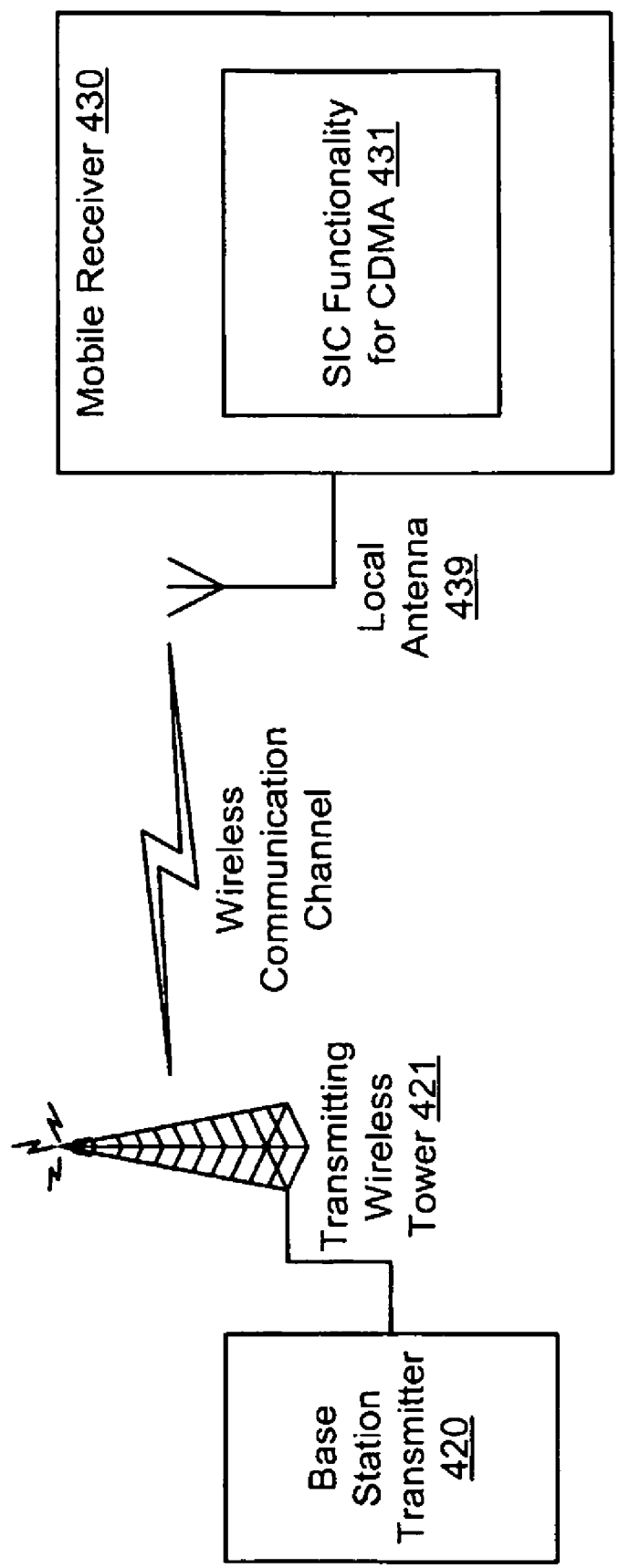
FIG. 4 is a system diagram illustrating another embodiment of a cellular communication system that is built according to the invention.

FIG. 4 is a system diagram illustrating another embodiment of a cellular communication system that is built according to the invention. From certain perspectives, the FIG. 4 may be viewed as being the reverse transmission operation of the cellular communication system 300 of the FIG. 3. A base station transmitter 420 is communicatively coupled to a transmitting wireless tower 421. The base station transmitter 420, using its transmitting wireless tower 421, transmits a signal to a local antenna 439 via a wireless communication channel. The local antenna 439 is communicatively coupled to a mobile receiver 430 so that the mobile receiver 430 is able to receive transmission from the transmitting wireless tower 421 of the base station transmitter 420 that have been communicated via the wireless communication channel. The local antenna 439 communicatively couples the received signal to the mobile receiver 430. It is noted that the mobile receiver 430 may be any number of types of transmitters including a cellular telephone, a wireless pager unit, a mobile computer having transmit functionality, or any other type of mobile transmitter.

The mobile receiver 430 is then able to support SIC functionality for CDMA according to the invention, as shown in a functional block 431, on the received signal. The FIG. 4 shows just one of many embodiments where the SIC functionality for CDMA, performed according to the invention, may be performed to provide for improved operation within a communication system.

Figure 5:
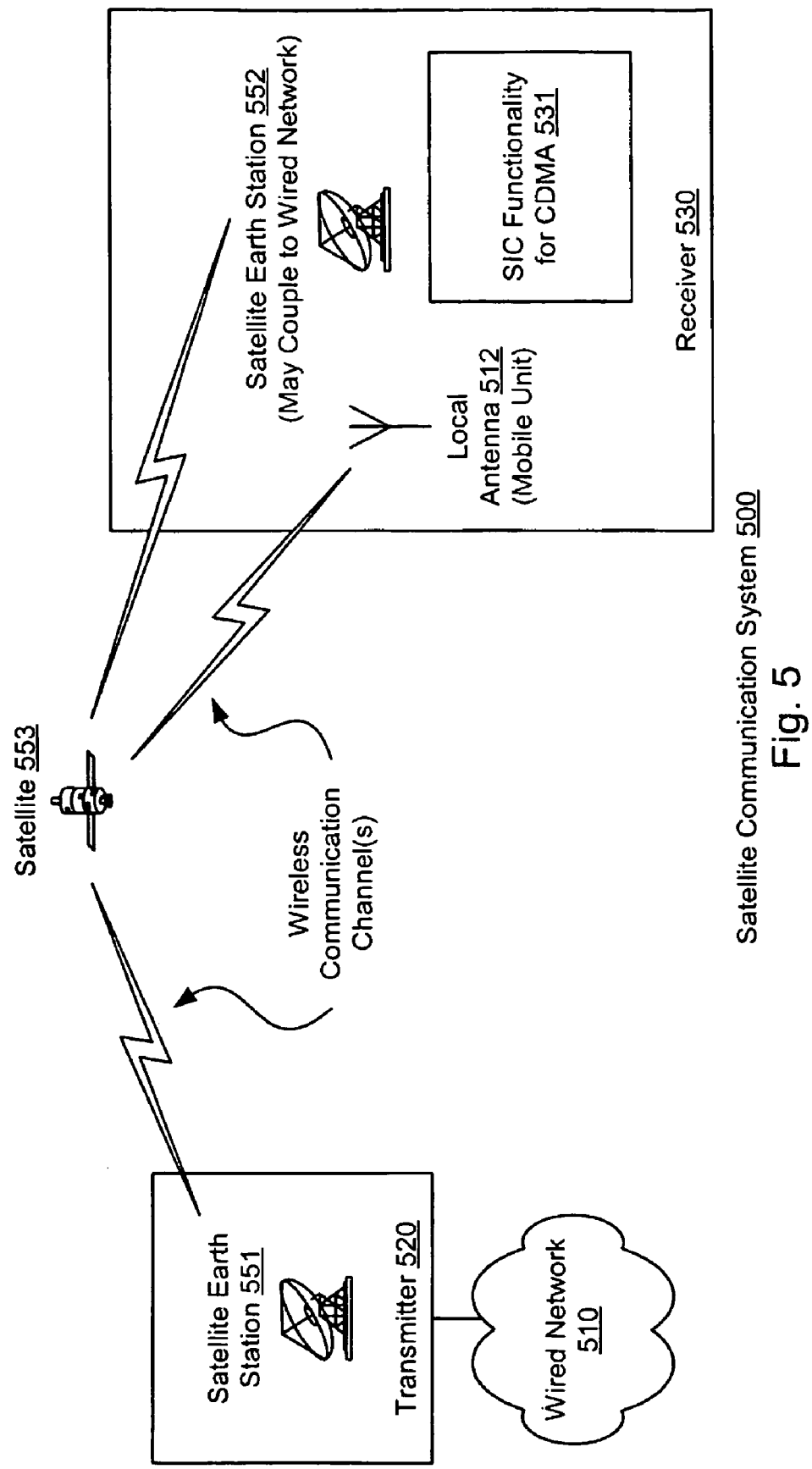
FIG. 5 is a system diagram illustrating an embodiment of a satellite communication system that is built according to the invention.

FIG. 5 is a system diagram illustrating an embodiment of a satellite communication system 500 that is built according to the invention. A transmitter 520 is communicatively coupled to a wired network 510. The wired network 510 may include any number of networks including the Internet, proprietary networks, . . . , and other wired networks. The transmitter 520 includes a satellite earth station 551 that is able to communicate to a satellite 553 via a wireless communication channel. The satellite 553 is able to communicate with a receiver 530. The receiver 530 is also located on the earth. Here, the communication to and from the satellite 553 may cooperatively be viewed as being a wireless communication channel, or each of the communication to and from the satellite 553 may be viewed as being two distinct wireless communication channels.

For example, the wireless communication "channel" may be viewed as not including multiple wireless hops in one embodiment. In other embodiments, the satellite 553 receives a signal received from the satellite earth station 551, amplifies it, and relays it to the receiver 530; the receiver 530 may include terrestrial receivers such as satellite receivers, satellite based telephones, . . . , and satellite based Internet receivers, among other receiver types. In the case where the satellite 553 receives a signal received from the satellite earth station 551, amplifies it, and relays it, the satellite 553 may be viewed as being a "transponder." In addition, other satellites may exist (and operate in conjunction with the satellite 553) that perform both receiver and transmitter operations. In this case, each leg of an up-down transmission via the wireless communication channel would be considered separately. Clearly, a wireless communication channel between the satellite 553 and a fixed earth station would likely be less time-varying than the wireless communication channel between the satellite 553 and a mobile station.

In whichever embodiment is implemented, the satellite 553 communicates with the receiver 530. The receiver 530 may be viewed as being a mobile unit in certain embodiments (employing a local antenna 512); alternatively, the receiver 530 may be viewed as being a satellite earth station 552 that may be communicatively coupled to a wired network in a similar manner that the satellite earth station 551, within the transmitter 520, communicatively couples to the wired network 510. In both situations, the receiver 530 is able to support SIC functionality for CDMA, as shown in a functional block 531 according to the invention. For example, the receiver 530 is able to perform SIC functionality for CDMA, as shown in a functional block 531, on the signal received from the satellite 553. The FIG. 5 shows just one of many embodiments where the SIC functionality for CDMA, performed according to the invention, may be performed to provide for improved receiver and system performance.

Figure 6:
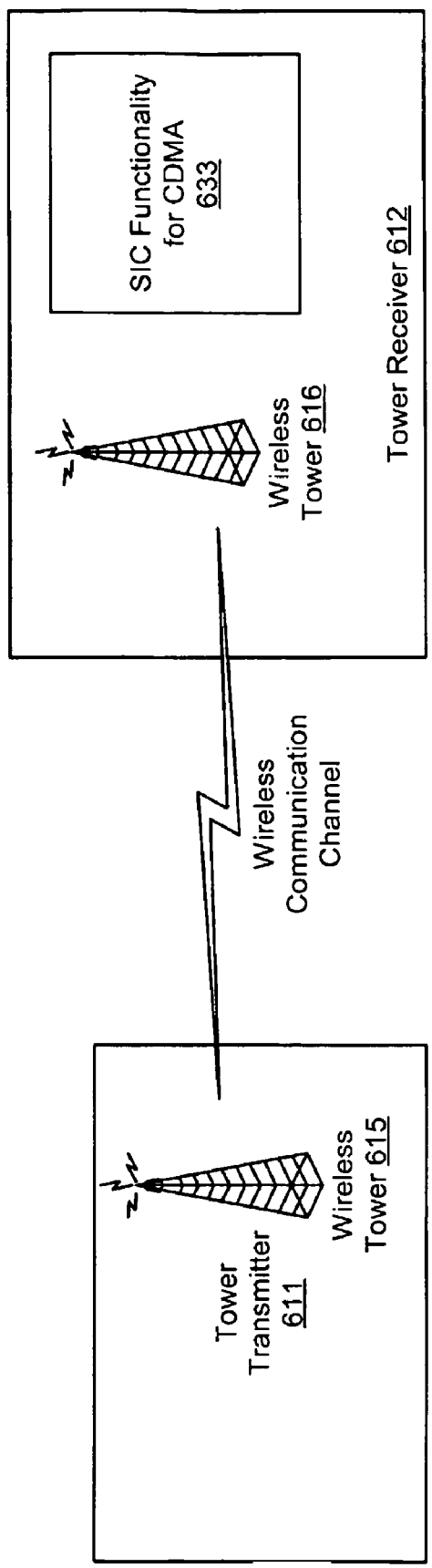
FIG. 6 is a system diagram illustrating an embodiment of a microwave communication system that is built according to the invention.

FIG. 6 is a system diagram illustrating an embodiment of a microwave communication system 600 that is built according to the invention. A tower transmitter 611 includes a wireless tower 615. The tower transmitter 611, using its wireless tower 615, transmits a signal to a tower receiver 612 via a wireless communication channel. The tower receiver 612 includes a wireless tower 616. The wireless tower 616 is able to receive transmissions from the wireless tower 615 that have been communicated via the wireless communication channel. The tower receiver 612 is then able to support SIC functionality for CDMA, as shown in a functional block 633. The FIG. 6 shows just one of many embodiments where SIC functionality for CDMA, performed according to the invention, may be performed to provide for improved receiver and system performance.

Figure 7:
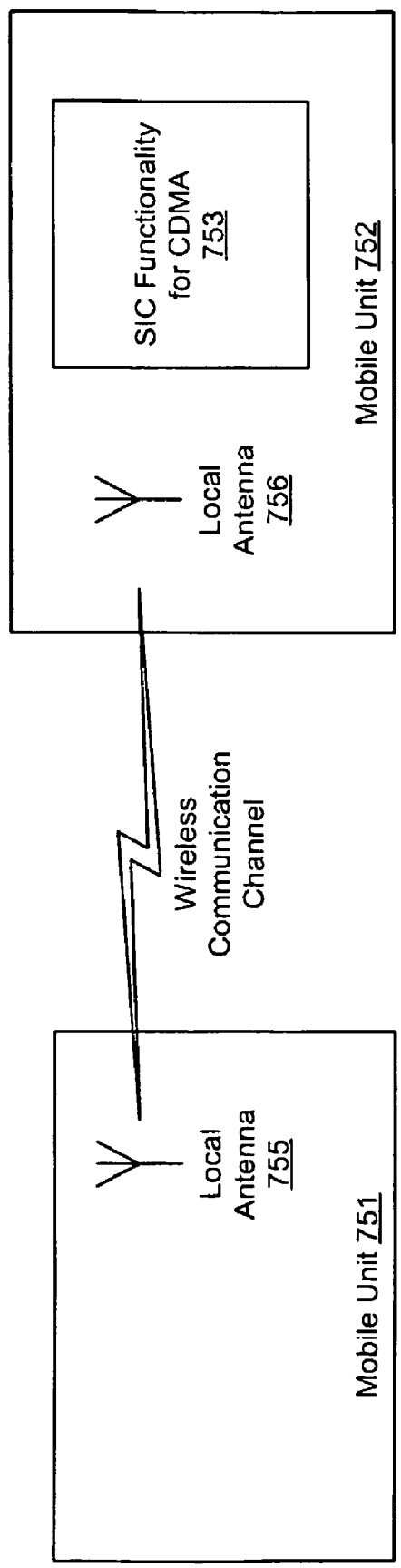
FIG. 7 is a system diagram illustrating an embodiment of a point-to-point radio communication system that is built according to the invention.

FIG. 7 is a system diagram illustrating an embodiment of a point-to-point radio communication system 700 that is built according to the invention. A mobile unit 751 includes a local antenna 755. The mobile unit 751, using its local antenna 755, transmits a signal to a local antenna 756 via a wireless communication channel. The local antenna 756 is included within a mobile unit 752. The mobile unit 752 is able to receive transmissions from the mobile unit 751 that have been communicated via the wireless communication channel. The mobile unit 752 is then able to support SIC functionality for CDMA, as shown in a functional block 753, on the received signal. The FIG. 7 shows just one of many embodiments where SIC functionality for CDMA, performed according to the invention, may be performed to provide for improved receiver and system performance.

Figure 8:
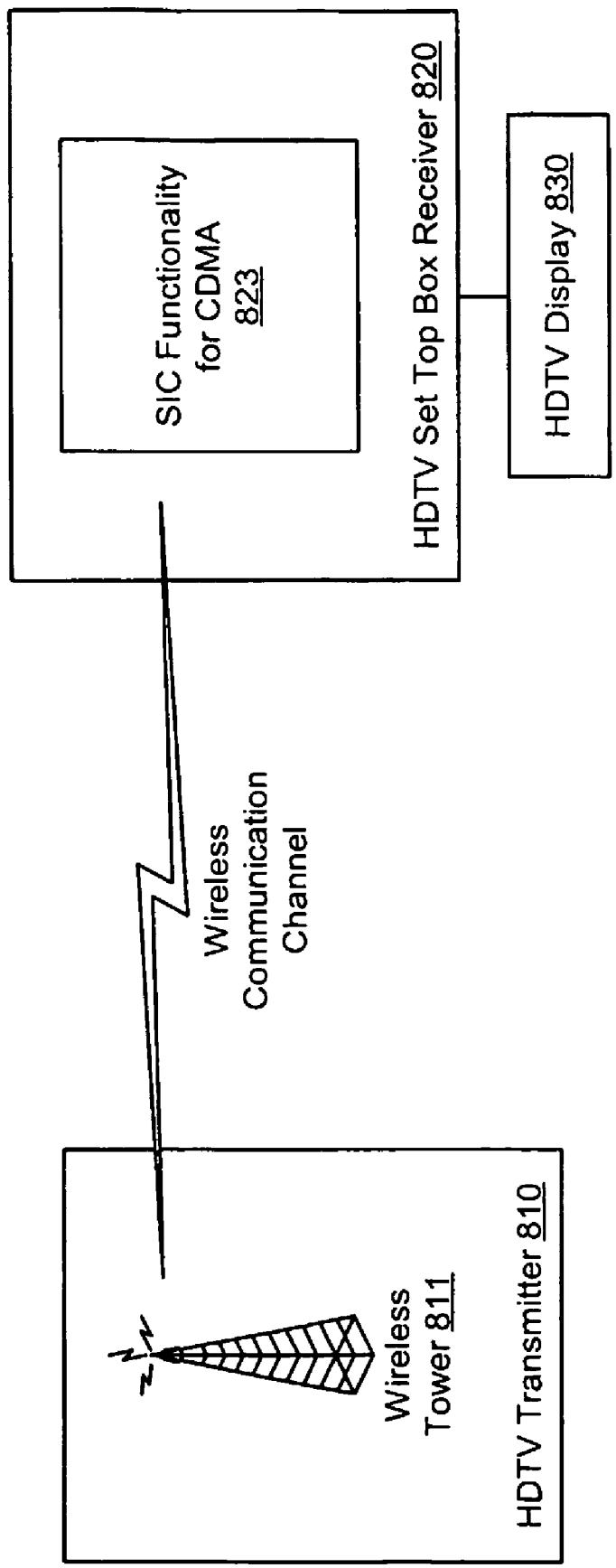
FIG. 8 is a system diagram illustrating an embodiment of a high definition television (HDTV) communication system that is built according to the invention.

FIG. 8 is a system diagram illustrating an embodiment of a high definition television (HDTV) communication system 800 that is built according to the invention. An HDTV transmitter 810 includes a wireless tower 811. The HDTV transmitter 810, using its wireless tower 811, transmits a signal to an HDTV set top box receiver 820 via a wireless communication channel. The HDTV set top box receiver 820 includes the functionality to receive the wireless transmitted signal. The HDTV set top box receiver 820 is also communicatively coupled to an HDTV display 630 that is able to display the demodulated and decoded wireless transmitted signals received by the HDTV set top box receiver 820.

The HDTV set top box receiver 820 is then able to support SIC functionality for CDMA, as shown in a functional block 823 to provide for improved receiver performance. The FIG. 8 shows yet another of many embodiments where SIC functionality for CDMA, performed according to the invention, may be performed to provide for improved receiver and system performance.

Figure 9:
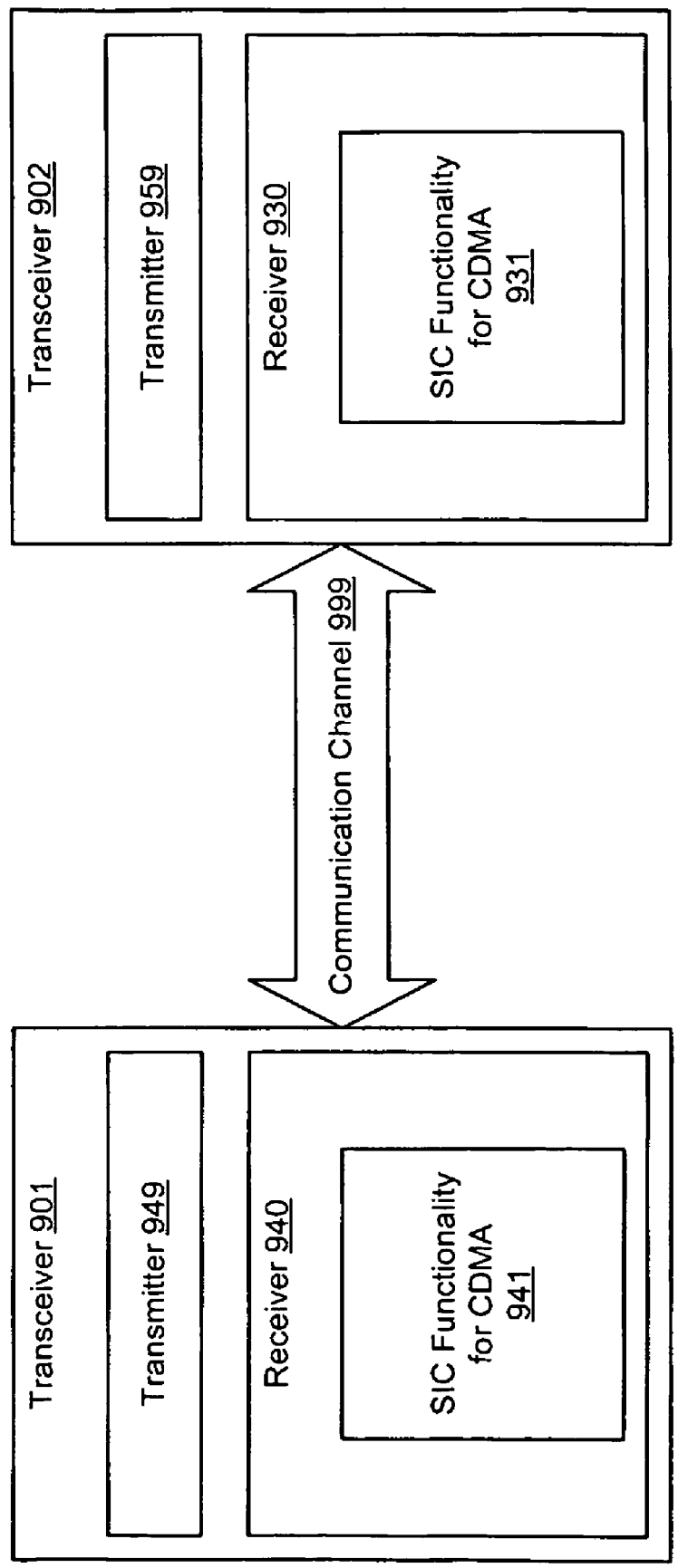
FIG. 9 is a system diagram illustrating an embodiment of a communication system that is built according to the invention.

FIG. 9 is a system diagram illustrating an embodiment of a communication system that is built according to the invention. The FIG. 9 shows communicative coupling, via a communication channel 999, between two transceivers, namely, between a transceiver 901 and a transceiver 902. The communication channel 999 may be a wired communication channel or a wireless communication channel.

Each of the transceivers 901 and 902 includes a transmitter and a receiver. For example, the transceiver 901 includes a transmitter 949 and a receiver 940; the transceiver 902 includes a transmitter 959 and a receiver 930. The receivers 940 and 930, within the transceivers 901 and 902, respectively, are each operable to support SIC functionality for CDMA according to the invention. This will allow improved signal processing for both of the transceivers 901 and 902. For example, the receiver 940, within the transceiver 901, is able to support SIC functionality for CDMA, as shown in a functional block 941, on a signal received from the transmitter 959 of the transceiver 902. Similarly, the receiver 930, within the transceiver 902, is able to support SIC functionality for CDMA, as shown in a functional block 931, on a signal received from the transmitter 949 of the transceiver 901. The FIG. 9 shows yet another of many embodiments where SIC functionality for CDMA, performed according to the invention, may be performed to provide for improved receiver performance.

Figure 10:
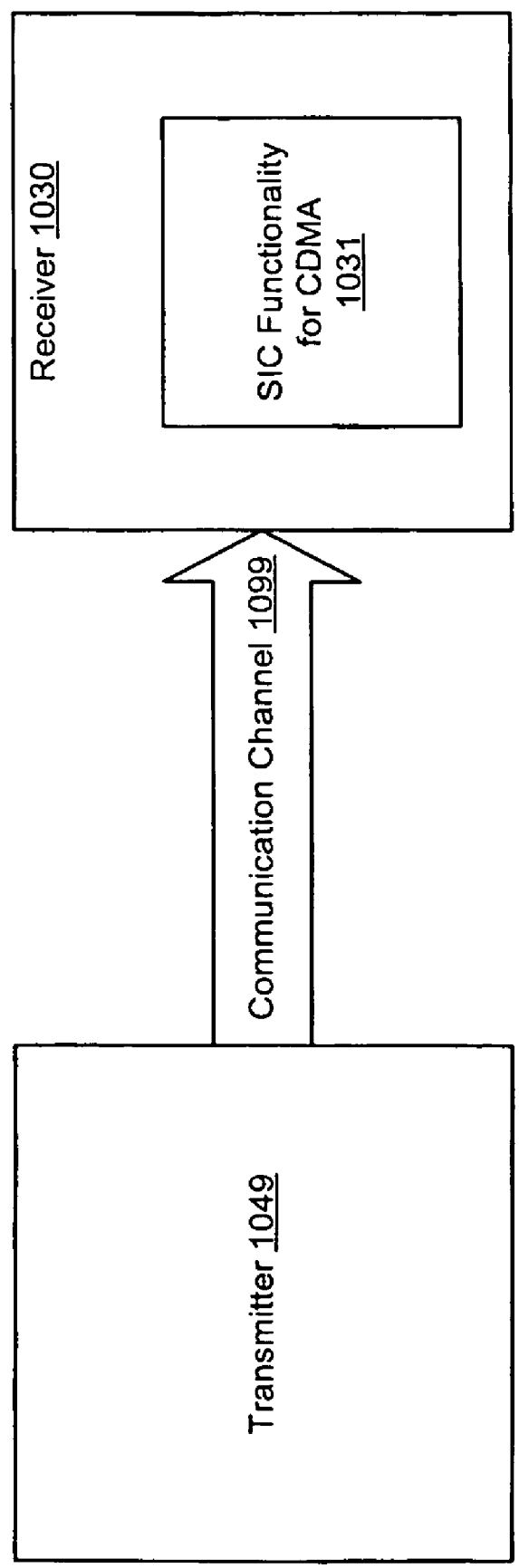
FIG. 10 is a system diagram illustrating another embodiment of a communication system that is built according to the invention.

FIG. 10 is a system diagram illustrating another embodiment of a communication system 1000 that is built according to the invention. The FIG. 10 shows communicative coupling, via a uni-directional communication channel 1099, between a transmitter 1049 and a receiver 1030. The communication channel 1099 may be a wired communication channel or a wireless communication channel. The receiver 1030 is operable to support SIC functionality for CDMA, as shown in a functional block 1031, according to the invention. The FIG. 10 shows yet another of many embodiments where SIC functionality for CDMA, performed according to the invention, may be performed to provide for improved receiver and system performance.

Figure 11:
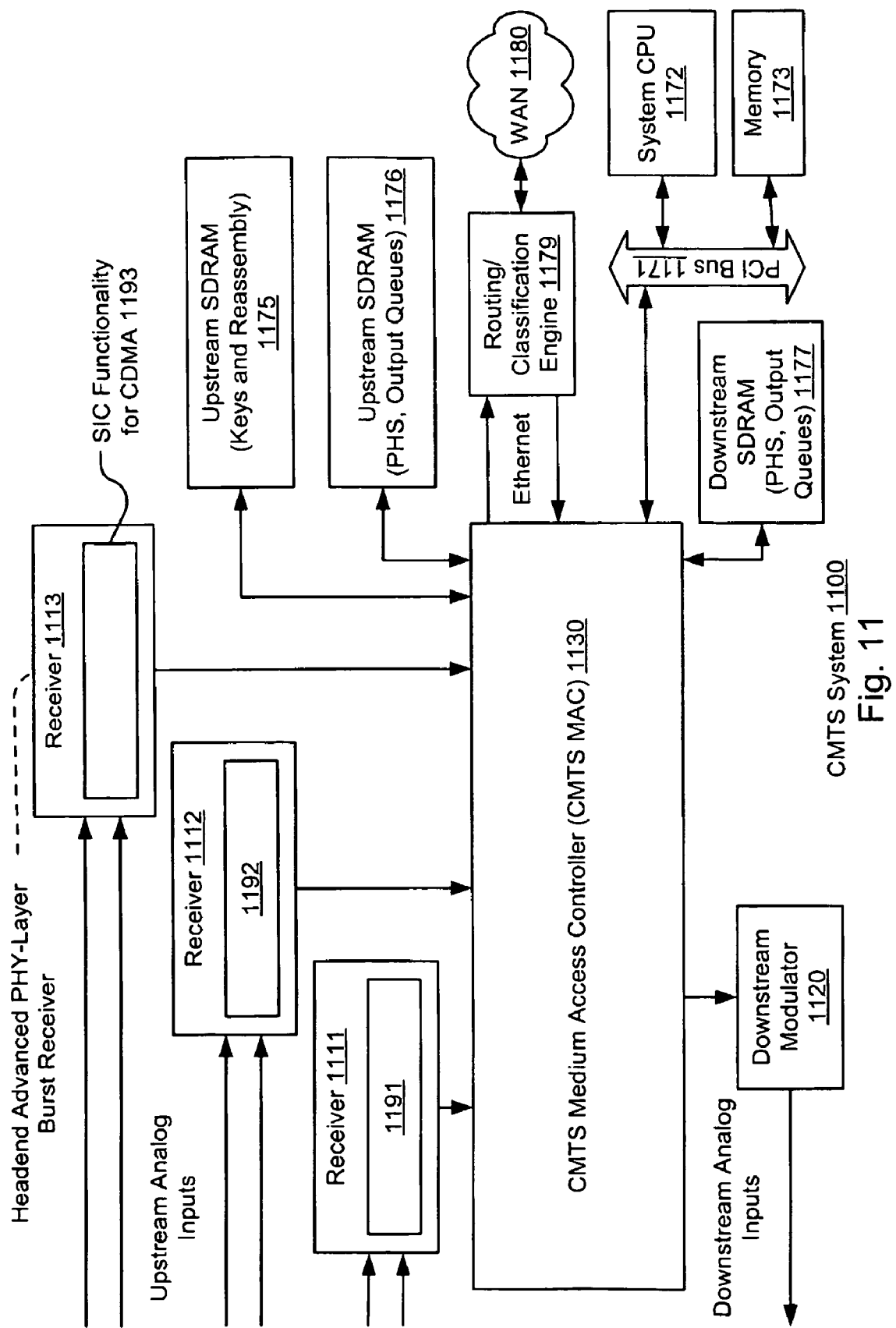
FIG. 11 is a system diagram illustrating an embodiment of a cable modem termination system (CMTS) system that is built according to the invention.
Figure 12:
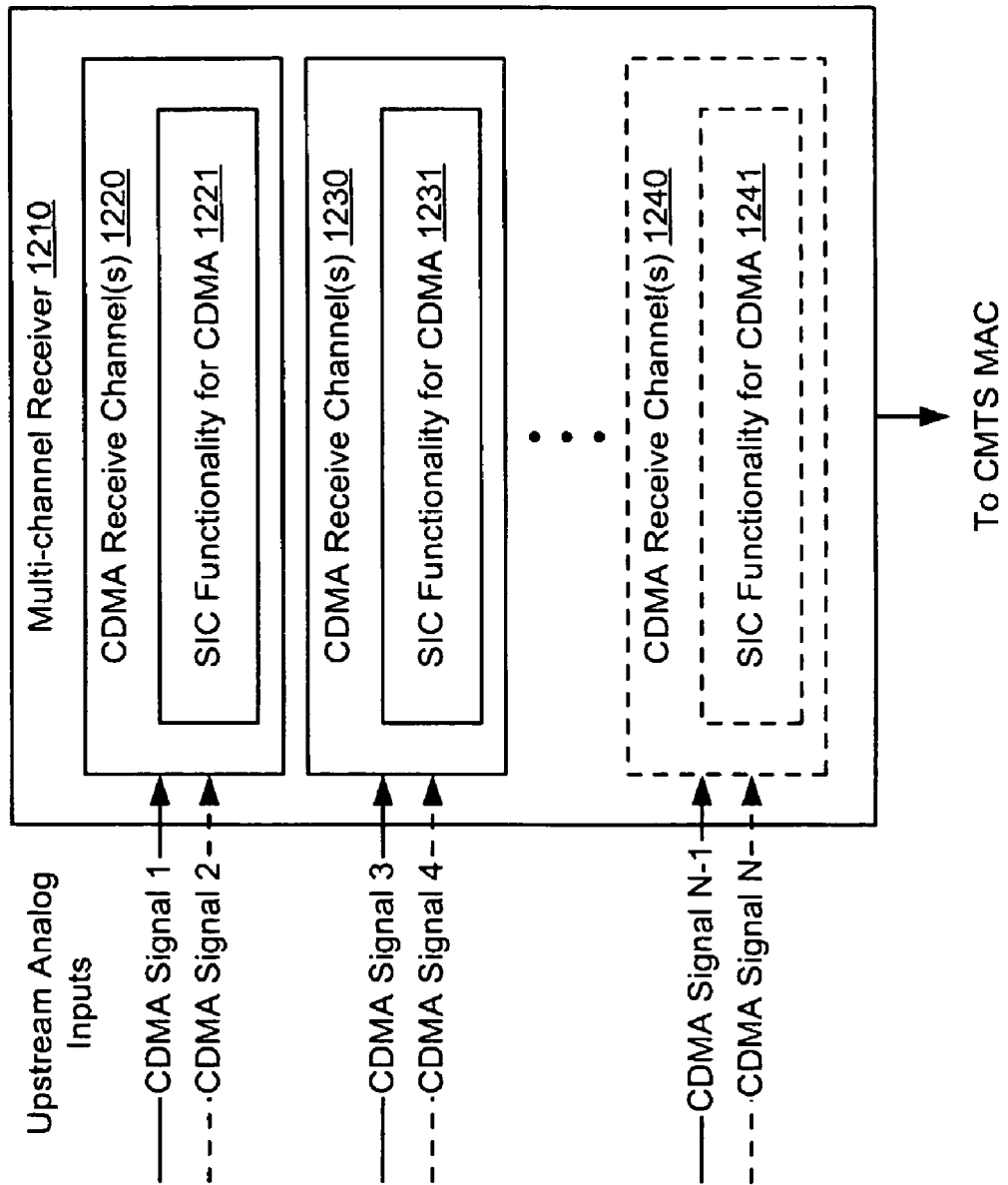
FIG. 12 is a system diagram illustrating an embodiment of a burst receiver system that is built according to the invention.

FIG. 11 is a system diagram illustrating an embodiment of a CMTS system 1100 that is built according to the invention. The CMTS system 1100 includes a CMTS medium access controller (MAC) 1130 that operates with a number of other devices to perform communication from one or more CMs to a WAN 1180. The CMTS MAC 1130 may be viewed as providing the hardware support for MAC-layer per-packet functions including fragmentation, concatenation, and payload header suppression that all are able to offload the processing required by a system central processing unit (CPU) 1172. This will provide for higher overall system performance. In addition, the CMTS MAC 1130 is able to provide support for carrier class redundancy via timestamp synchronization across a number of receivers, shown as a receiver 1111, a receiver 1111, and a receiver 1113 that are each operable to receive upstream analog inputs. In certain embodiments, each of the receivers 1111, 1112, and 1113 are dual universal advanced TDMA/CDMA (Time Division Multiple Access/Code Division Multiple Access) PHY-layer burst receivers. That is to say, each of the receivers 1111, 1112, and 1113 includes at least one TDMA receive channel and at least one CDMA receive channel; in this case, each of the receivers 1111, 1112, and 1113 may be viewed as being multi-channel receivers. In other embodiments, the receivers 1111, 1112, and 1113 includes only CDMA receive channels. An embodiment of a receiver including only CDMA receive channels is shown in FIG. 12.

In addition, the CMTS MAC 1130 may be operated remotely with a routing/classification engine 11 79 that is located externally to the CMTS MAC 1130 for distributed CMTS applications including mini fiber node applications. Moreover, a Standard Programming Interface (SPI) master port may be employed to control the interface to the receivers 1111, 1112, and 1113 as well as to a downstream modulator 1120.

The CMTS MAC 1130 may be viewed as being a highly integrated CMTS MAC integrated circuit (IC) for use within the various DOCSIS and advanced TDMA/CDMA physical layer (PHY-layer) CMTS products. The CMTS MAC 1130 employs sophisticated hardware engines for upstream and downstream paths. The upstream processor design is segmented and uses two banks of Synchronous Dynamic Random Access Memory (SDRAM) to minimize latency on internal buses. The two banks of SDRAM used by the upstream processor are shown as upstream SDRAM 1175 (operable to support keys and reassembly) and SDRAM 1176 (operable to support Packaging, Handling, and Storage (PHS) and output queues). The upstream processor performs Data Encryption Standard (DES) decryption, fragment reassembly, de-concatenation, payload packet expansion, packet acceleration, upstream Management Information Base (MIB) statistic gathering, and priority queuing for the resultant packets. Each output queue can be independently configured to output packets to either a Personal Computer Interface (PCI) or a Gigabit Media Independent Interface (GMII). DOCSIS MAC management messages and bandwidth requests are extracted and queued separately from data packets so that they are readily available to the system controller.

The downstream processor accepts packets from priority queues and performs payload header suppression, DOCSIS header creation, DES encryption, Cyclic Redundancy Check (CRC) and Header Check Sequence (of the DOCSIS specification), Moving Pictures Experts Group (MPEG) encapsulation and multiplexing, and timestamp generation on the in-band data. The CMTS MAC 1130 includes an out-of-band generator and CDMA PHY-layer (and/or TDMA PHY-layer) interface so that it may communicate with a CM device's out-of-band receiver for control of power management functions. The downstream processor will also use SDRAM 1177 (operable to support PHS and output queues). The CMTS MAC 1130 may be configured and managed externally via a PCI interface and a PCI bus 1171.

Each of the receivers 1111, 1112, and 1113 is operable to support SIC functionality for CDMA. For example, the receiver 1111 is operable to support SIC functionality for CDMA, as shown in a functional block 1191; the receiver 1112 is operable to support SIC functionality for CDMA, as shown in a functional block 1192; and the receiver 1113 is operable to support SIC functionality for CDMA, as shown in a functional block 1193. The FIG. 11 shows yet another embodiment in which SIC functionality for CDMA may be performed according to the invention. Any of the functionality and operations described in the other embodiments may be performed within the context of the CMTS system 1100 without departing from the scope and spirit of the invention.

FIG. 12 is a system diagram illustrating an embodiment of a burst receiver system 1200 that is built according to the invention. The burst receiver system 1200 includes at least one multi-channel receiver 1210. The multi-channel receiver 1210 is operable to receive a number of upstream analog inputs that are transmitted from CMs. The upstream analog inputs may be in the form of either TDMA (Time Division Multiple Access) and/or CDMA (Code Division Multiple Access) format. A number of receive channels may be included within the multi-channel receiver 1210. The FIG. 12 shows a particular embodiment where the multi-channel receiver 1210 includes a number of CDMA receive channels; however, TDMA receive channels may also be included.

For example, the multi-channel receiver 1210 is operable to support CDMA receive channels 1220 (shown as CDMA signal 1 and CDMA signal 2) and to support SIC functionality for CDMA, as shown in a functional block 1221, for those received CDMA signals. In addition, the multi-channel receiver 1210 is operable to support CDMA receive channels 1230 (shown as CDMA signal 3 and CDMA signal 4) and to support SIC functionality for CDMA, as shown in a functional block 1231, for those received CDMA signals; the multi-channel receiver 1210 is operable to support CDMA receive channels 1240 (shown as CDMA signal N and CDMA signal N-1) and to support SIC functionality for CDMA, as shown in a functional block 1241, for those received CDMA signals.

Generically speaking, the multi-channel receiver 1210 is operable to support a number of receive channels and to support SIC functionality for CDMA for those received signals. The multi-channel receiver 1210 of the FIG. 12 is operable to interface with a CMTS MAC. The burst receiver system 1200 may include a number of multi-channel receivers that are each operable to interface with the CMTS MAC.

In certain embodiments, the multi-channel receiver 1210 provides a number of various functionalities. The multi-channel receiver 1210 may be a universal headend advanced TDMA PHY-layer QPSK/QAM (Quadrature Phase Shift Keying/Quadrature Amplitude Modulation) burst receiver; the multi-channel receiver 1210 also include functionality to be a universal headend advanced CDMA PHY-layer QPSK/QAM burst receiver; or the multi-channel receiver 1210 also include functionality to be a universal headend advanced TDMA/CDMA PHY-layer QPSK/QAM burst receiver offering both TDMA/CDMA functionality. The multi-channel receiver 1210 may be DOCSIS/EuroDOCSIS based, IEEE 802.14 compliant. The multi-channel receiver 1210 may be adaptable to numerous programmable demodulation including BPSK (Binary Phase Shift Keying), and/or QPSK, 8/16/32/64/128/256/516/1024 QAM. The multi-channel receiver 1210 is adaptable to support variable symbols rates as well. Other functionality may likewise be included to the multi-channel receiver 1210 without departing from the scope and spirit of the invention. Such variations and modifications may be made to the communication receiver.

While a particular embodiment of a burst receiver system 1200 is illustrated within the FIG. 12, it is also noted that a continuous receiver will also support SIC functionality for CDMA according to the invention. In general, any CDMA receiver may be adapted to support the SIC functionality for CDMA according to the invention.

Figure 13:
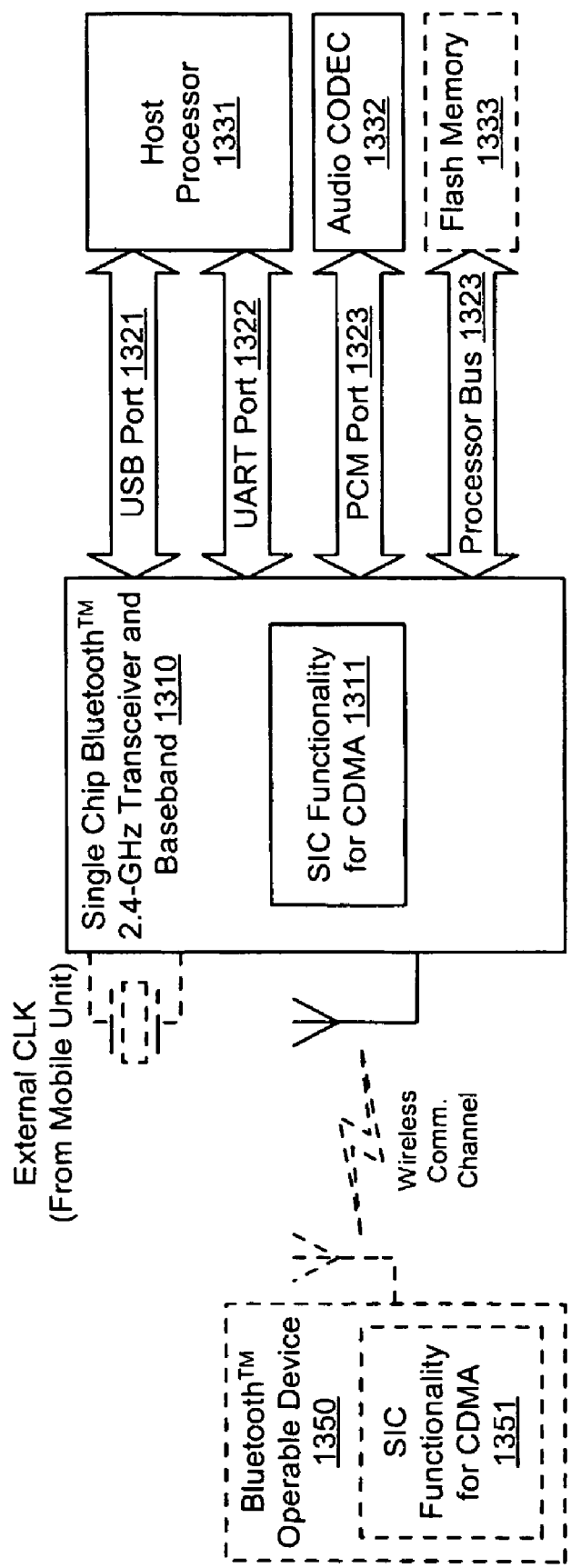
FIG. 13 is a system diagram illustrating an embodiment of a Bluetooth™ communication system that is built according to the invention.

FIG. 13 is a system diagram illustrating an embodiment of a Bluetooth™ communication system 1300 that is built according to the invention. The Bluetooth™ wireless technology is an open specification for a small-form-factor, low-cost, personal area network connection among mobile computers, mobile phones and other devices. The Bluetooth™ wireless technology specification provides secure, radio-based transmission of data and voice. It delivers opportunities for rapid, ad hoc, automatic, wireless connections, even when devices are not within the line of sight. The Bluetooth™ wireless technology uses a globally available frequency range to ensure interoperability no matter where you travel.

Bluetooth™ is a standard for a small, cheap radio chip to be plugged into computers, printers, mobile phones, etc. A Bluetooth™ chip is designed to replace cables by taking the information normally carried by the cable, and transmitting it at a special frequency to a receiver Bluetooth chip, which will then give the information received to the computer, phone whatever. In certain embodiments, Bluetooth™ communicates on a frequency of 2.45 gigahertz (GHz), which has been set aside by international agreement for the use of industrial, scientific and medical devices (ISM).

The Bluetooth™ wireless technology was developed by the Bluetooth™ Special Interest Group, which was founded in 1998 to define an industry-wide specification for connecting personal and business mobile devices. More than 1,400 companies are now members of the Special Interest Group, signifying the industry's unprecedented acceptance of the Bluetooth™ wireless technology.

The FIG. 13 shows a Bluetooth operable device that is operable to communicate with another device via a wireless communication channel. The Bluetooth™ operable device may be a computer, printer, and/or mobile phone (or other device) without departing from the scope and spirit of the invention. Specifically, the FIG. 13 shows a single chip Bluetooth™ 2.4 GHz transceiver and baseband device 1310 that is operable to support SIC functionality for CDMA as shown in a functional block 1311. From certain perspectives, the single chip Bluetooth™ 2.4 GHz transceiver and baseband device 1310 may be viewed as being a complete single chip Bluetooth™ compliant, single chip solution that integrates the 2.4 GHz fractional-N radio transceiver and baseband controller. The 2.4 GHz fractional-N radio transceiver portion is operable to receive a clock signal from an external clock (say, from a mobile unit) in certain embodiments. The single chip Bluetooth™ 2.4 GHz transceiver and baseband device 1310 will provide for a wide range of wireless communication and networking applications, including mobile phones, PCs, laptops, PDAs, and other peripheral devices. The other device may be a Bluetooth™ device 1350, that may also be operable to support SIC functionality for CDMA as shown in a functional block 1351.

In certain embodiments, a radio section of the single chip Bluetooth™ 2.4 GHz transceiver and baseband device 1310 incorporates the complete receive and transmit paths, including PLL, VCO, LNA, PA, up-converter, down-converter, modulator, demodulator, and channel select filtering.

The baseband section of the single chip Bluetooth™ 2.4 GHz transceiver and baseband device 1310 controls all Bluetooth™ functionality from the PHY radio to the HCI layer. This includes all bit-level processing, event scheduling, voice/data flow, and on-chip USB/UART/Audio PCM interfaces (as provided by a USB Port 1321 and a UART Port 1322 that may communicatively couple to a host processor 1331, by a PCM Port 1323 that may communicatively couple to an audio CODEC 1332). In addition, the single chip Bluetooth™ 2.4 GHz transceiver and baseband device 1310 is also operable to communicatively couple to an (optional) flash memory via a processor bus 1323.

The single chip Bluetooth™ 2.4 GHz transceiver and baseband device 1310 is a monolithic component implemented in a standard digital CMOS process, and requires minimal external components to provide a low-cost BOM solution.

It is noted that the single chip Bluetooth™ 2.4 GHz transceiver and baseband device 1310 within the FIG. 13 shows yet another embodiment of device that is operable to support SIC functionality for CDMA according to the invention. Clearly, other Bluetooth™ communication systems may also be adapted to support the SIC functionality for CDMA as well.

Figure 14:
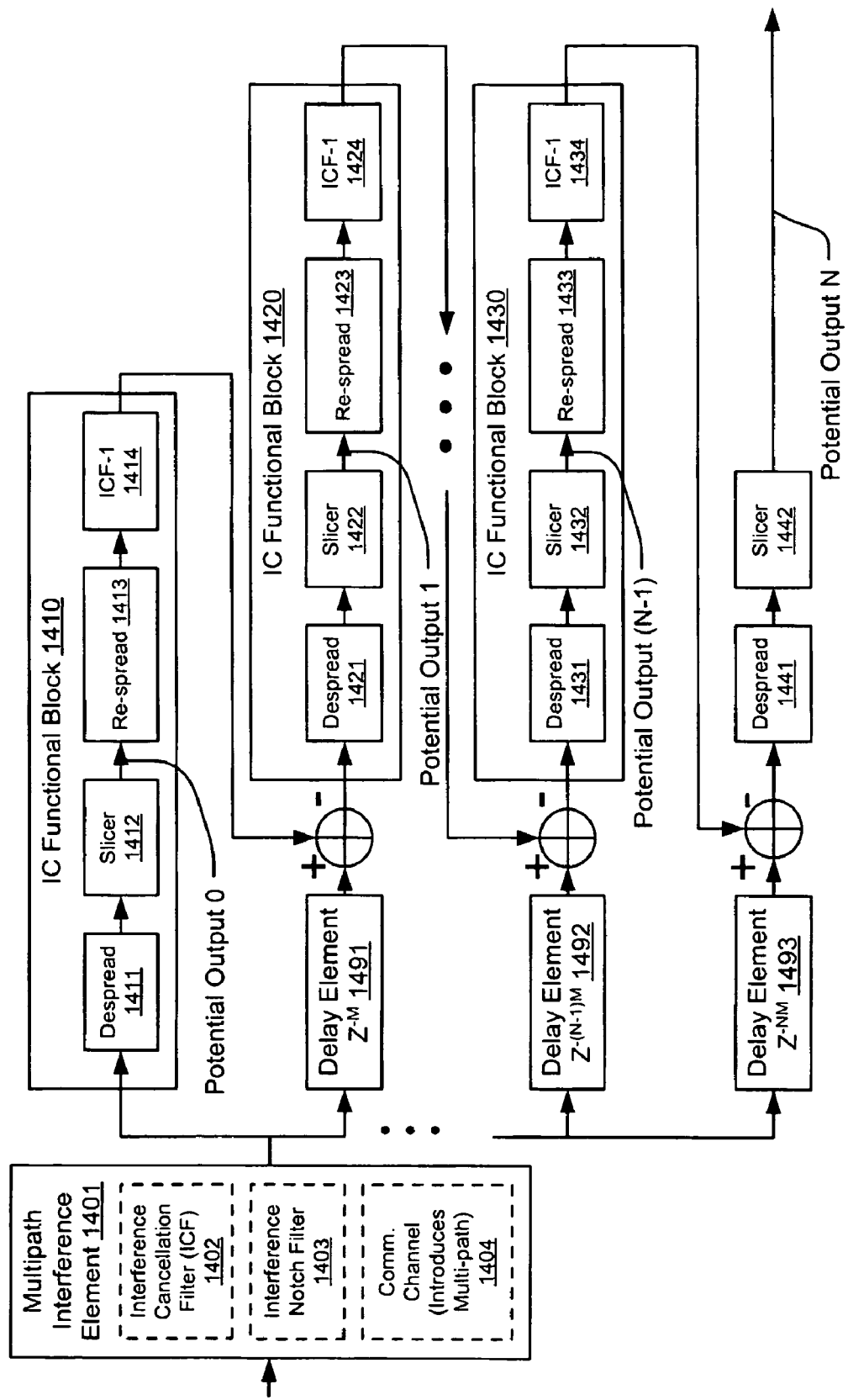
FIG. 14 is a functional block diagram illustrating an embodiment of successive interference canceling (SIC) functionality for CDMA that is arranged according to the invention in a parallel implementation.

FIG. 14 is a functional block diagram illustrating an embodiment of successive interference canceling (SIC) functionality for CDMA 1400 that is arranged according to the invention in a parallel implementation. In a block 1401, a spread signal is received from an element 1401 that has undesirably introduced multipath interference. This multipath interference may be caused by a variety of sources. For example, one source of the multipath interference may be from the effects of the communication channel itself as shown in a block 1404. However, other elements that may be employed to compensate for the existence of narrowband interference within a signal received by a communication receiver; sometimes, these introduced elements actually will introduce some degree of multipath interference. For example, some elements that are employed to minimize the effects of ingress and/or narrowband interference may include an interference cancellation filter (ICF) 1402 and/or an interference notch filter 1403. The multipath interference element 1401 may be viewed, at the very least, as being an element that introduces multi-path effects into the signal received by the SIC functionality for CDMA 1400. The attenuation of some of the component energy in the signals destroys the perfect orthogonality of the set of CDMA symbols, which results in ICI. In general, the ICF suppresses or "notch filters" portions of the frequency domain, which is intended to attenuate ingress, but also introduces ICI in the process.

The FIG. 14 shows a functional block diagram of the parallel implementation of the invention. In this approach, two or more successive interference canceling (SIC) stages are shown by the IC functional blocks. The approach also employs a buffer of size M, which should be adequate to store the output of the ICF till despread, slice, re-spread, and convolution operations are done. The ICF taps are chosen to notch out (or "blank") any present ingress in the signal. The computation of these taps may be performed using any approach known in the art.

For example, the signal output by the multipath interference element 1401 is simultaneously provided to an interference cancellation (IC) functional block 1410 and a delay element $Z^{-M}$ 1491. When multiple iterations of ICF are to be performed using the SIC functionality for CDMA 1400, ... the output of the multipath interference element 1401 is also simultaneously provided to a delay element $Z^{-(N-1)M}$ 1492 (when multiple iterations are performed), and to a delay element $Z^{-NM}$ 1492 (when N iterations are performed). The output of the IC functional block 1410 may be selected when there is no multipath interference in the received signal whatsoever. The IC functional block 1410 includes a despread functional block 1411, a slicer 1412, a re-spread functional block 1413, and an ICF-1 functional block 1414 (to perform convolution operations) according to the invention; the ICF-1 functional blocks described herein may also be referred to as convolution functional blocks.

The despread functional block 1411 generates the soft decision of the received signal. The slicer 1412 makes a hard decision based on the soft decision provided by the despread functional block 1411. These hard decisions by the slicer 1412 make the decisions offline with no cleaning of the signal; that is to say, without removing any ISI that exists among the chips. These hard decisions may include a number of errors that would be too significant within data applications, but they will give some accuracy of the received data even though there may be many error contained therein. This initial estimate of the data is then re-spread, in the functional block 1413, to reconstruct the chip level ISI. Then, the operation within the ICF-1 functional block 1414 generates the reconstructed ISI (on a chip level) of all of the other taps besides this first tap.

The functional operations of the functional blocks 1413 and 1414 together, is described as partially re-modulating the hard decisions in U.S. Utility Patent application Ser. No. 10/136,059, entitled "CHIP BLANKING AND PROCESSING IN S-CDMA TO MITIGATE IMPULSE AND BURST NOISE AND/OR DISTORTION,". This is also true for other embodiments described herein that perform similar functionality as the functional blocks 1413 and 1414.

This result may then be subtracted from the output of the delay element $Z^{-M}$ 1491. The delay length of the buffer, delay element $Z^{-M}$ 1491, is sufficient to match substantially the time required to perform the operations within each of the elements of the IC functional block 1410.

This chain of IC functionality may be repeated successively if desired to provide for even further improved performance. For example, the output of the node (the first summing node) where the output of the delay element $Z^{-M}$ 1491 and the negative output of the IC functional block 1410 are summed together may be fed into an IC functional block 1420. The IC functional block 1420 will include comparable elements of the IC functional block 1410. For example, the IC functional block 1420 includes a despread functional block 1421 that generates soft decision of the output from the first summing node. A slicer 1422 makes a hard decision based on the soft decision provided by the despread functional block 1421. These hard decisions by the slicer 1422 make the decisions offline with an improved, cleaner signal; that is to say, some of the ISI that exists among the chips will have been removed by the operations described above. These hard decisions will include a fewer number of errors than in the previous chain of IC functionality. This next $2^{nd}$ order initial estimate of the data is then re-spread, in a functional block 1423, to reconstruct the chip level ISI (which will be reduced when compared to the previous chain).

Then, the operation within an ICF-1 functional block 1424 generates the reconstructed ISI (on a chip level) of all of the other taps besides this first tap. Functional blocks 1423 and 1424 constitute the generation of the partial re-modulated energy described in U.S. Utility patent application Ser. No. 10/136,059, entitled "CHIP BLANKING AND PROCESSING IN S-CDMA TO MITIGATE IMPULSE AND BURST NOISE AND/OR DISTORTION,".

Again, this reconstructed ISI will be relatively less than in the first chain. This result may then be subtracted from the output of a delay element $Z^{-(N-1)M}$ 1492. The delay length of the buffer, delay element $Z^{-(N-1)M}$ 1492, is sufficient to match substantially the time required to perform the operations within each of the elements of the IC functional block 1410, within each of the elements of the IC functional block 1420, and any additional IC functional blocks that are employed.

It is noted that the resultant output of the slicer 1412 within the IC functional block 1410 may be selected as an output. Alternatively, the resultant output of the slicer 1422 within the IC functional block 1420 may be selected as an output when it has been determined that a solution has been reached (say when a difference between potential output 0 and potential output 1 are within a predetermined degree of magnitude). Alternatively, this potential output 1 may be selected when a predetermined number of chains (2 in such an embodiment) are selected to be performed. Another method of determining when to end this process is to look at the Signal to Noise Ratio (SNR) of the signal and to select the output from one of the stages when the SNR meets a predetermined threshold.

Subsequent chains may be implemented successively as desired to provide even further performance. For example, multiple chains may be included up to an IC functional block 1430 (having a de-spread functional block 1431, a slicer 1432, a re-spread functional block 1433, and an ICF-1 functional block 1434) may also be employed when they are preceded by the appropriate delay stages. The outputs of each of the slicers 1412, 1422, . . . , and 1432 (within the IC functional blocks 1410, 1420, . . . , and 1430) may be selected as outputs using any of the conditions described above. After the final iteration, the output of the IC functional block 1430 is subtracted from the output of the delay element $Z^{-NM}$ 1493 whose delay is sufficient to match substantially the time required to perform the operations within each of the elements of the IC functional blocks 1410, 1420, . . . , and 1430. This signal is de-spread using the de-spread functional block 1441 to generate soft decisions and then to a slicer 1442 to generate hard decisions there from; the de-spread functional block 1441 may be viewed as being an output de-spread functional block and the slicer 1442 may be viewed as being an output slicer.

The parallel implementation of the SIC functionality for CDMA 1400 may be preferable in an application where hardware is not significantly limited by given design. Other designs, where hardware is much more constrained, or more expensive than hardware, may benefit from a serial implementation described below in FIG. 15.

Figure 15:
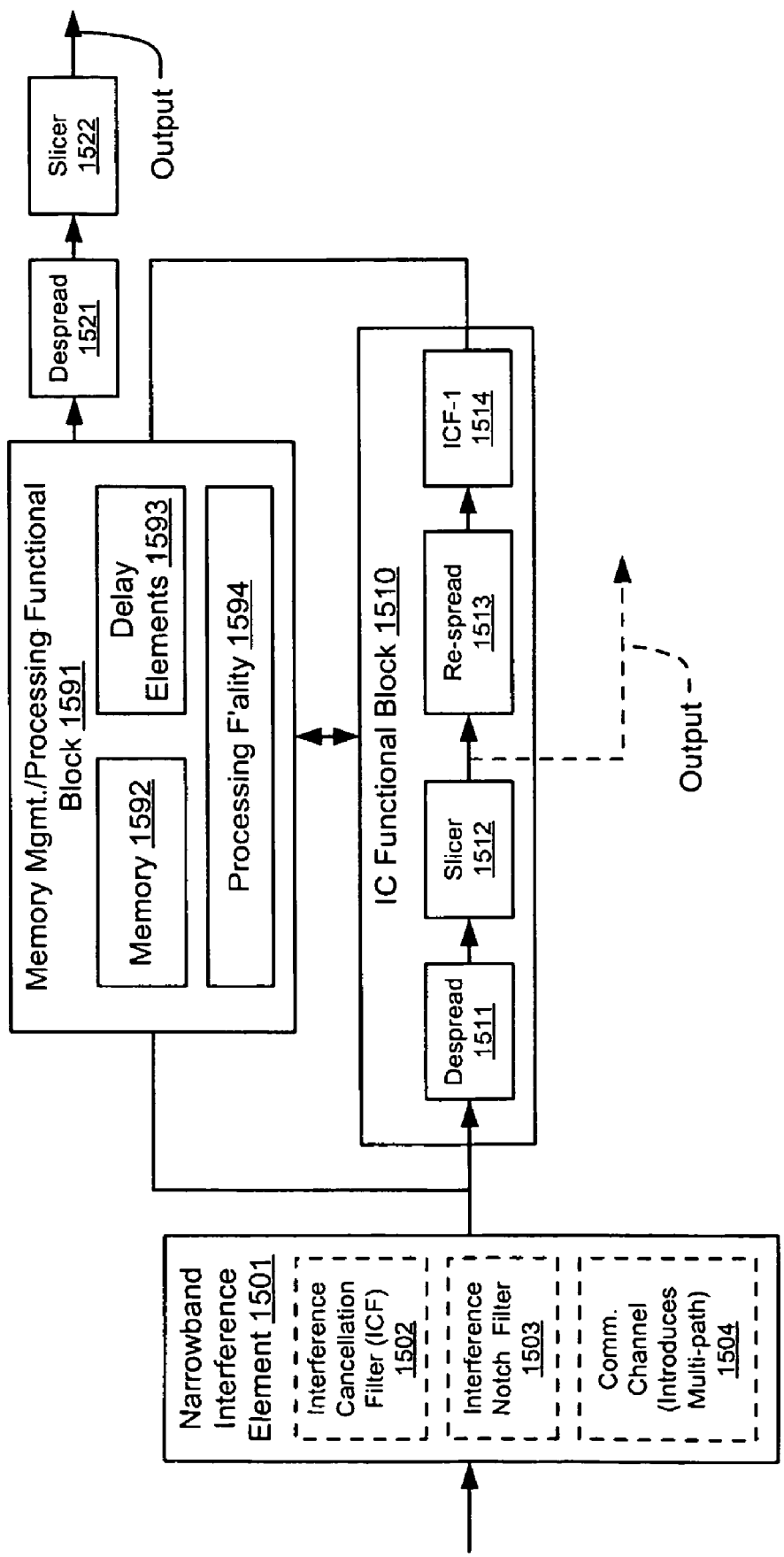
FIG. 15 is a functional block diagram illustrating an embodiment of SIC functionality for CDMA that is arranged according to the invention in a serial implementation.

FIG. 15 is a functional block diagram illustrating an embodiment of successive interference canceling (SIC) functionality for CDMA 1500 that is arranged according to the invention in a serial implementation. In a block 1501, a spread signal is received from an element 1501 that has undesirably introduced multipath interference. This multipath interference may be caused by a variety of sources. For example, one source of the multipath interference may be from the effects of the communication channel itself as shown in a block 1504. However, other elements that may be employed to compensate for the existence of narrowband interference within a signal received by a communication receiver; sometimes, these introduced elements actually will introduce some degree of multipath interference. For example, some elements that are employed to minimize the effects of ingress and/or narrowband interference may include an interference cancellation filter (ICF) 1502 and/or an interference notch filter 1503. The multipath interference element 1501 may be viewed, at the very least, as being an element that introduces multi-path effects into the signal received by the SIC functionality for CDMA 1500. The attenuation of some of the component energy in the signals destroys the perfect orthogonality of the set of CDMA symbols, which results in ICI. In general, the ICF suppresses or "notch filters" portions of the frequency domain, which is intended to attenuate ingress, but also introduces ICI in the process.

The FIG. 15 shows a functional block diagram of the serial implementation of the invention. In this approach, a single successive interference canceling (SIC) stage is shown by an IC functional block 1510. The IC functional block 1510 is implemented in such a way that it may be used over and over again. The FIG. 15 shows an embodiment where a single IC functional block is employed. Clearly, two IC functional blocks could also be employed in a ping-pong embodiment as well.

For example, the signal output by the multipath interference element 1501 is provided to the IC functional block 1510. The output of the IC functional block 1510 (after passing through only once) may be selected when there is no multipath interference in the received signal whatsoever. The IC functional block 1510 includes a despread functional block 1511, a slicer 1512, a re-spread functional block 1513, and an ICF-1 functional block 1514 (to perform convolution operations) according to the invention.

The despread functional block 1511 generates the soft decision of the received signal. The slicer 1512 makes a hard decision based on the soft decision provided by the despread functional block 1511. These hard decisions by the slicer 1512 make the decisions offline with no cleaning of the signal; that is to say, without removing any ISI that exists among the chips. These hard decisions may include a number of errors that would be too significant within data applications but they will give some accuracy of the received data even though there may be many error contained therein.

This initial estimate of the data is then re-spread, in the functional block 1513, to reconstruct the chip level ISI. Then, the operation within the ICF-1 functional block 1514 generates the reconstructed ISI (on a chip level) of all of the other taps besides this first tap.

This result (after passing through the IC functional block 1510 one time) may then be provided to a memory management/processing functional block 1591. The original signal, received from the multipath interference element 1501 has also been stored in a memory 1592 of the memory management/processing functional block 1591 where it has been buffered properly using delay elements 1593. The memory management/processing functional block 1591 is also operable to transfer and buffer subsequent interference cancelled versions of the signal as well. Herein, the output from the IC functional block 1510 (after passing through one time) is subtracted from the buffered and delayed version of the original signal using processing functionality 1594; the delay length of the buffer would be $Z^{-M}$ that is sufficient to match substantially the time required to perform the operations within each of the elements of the IC functional block 1510. Multiple, and if desired selectable, delay elements within the delay elements 1593 may be used to perform provide buffering and delaying of the various versions stored therein. The memory management/processing functional block 1591 operates in conjunction with the IC functional block 1510 to perform one, two, . . . , or more iterations of SIC functionality for CDMA using the IC functional block 1510 multiple times.

The memory management/processing functional block 1591 is operable to perform buffering (of various sizes M, 2M, and (N−1)M, NM), which should be adequate to store the output of the ICF till despread, slice, re-spread, and convolution operations are done in subsequent iterations. The ICF taps of the ICF-1 functional block 1514 are chosen to notch out any present ingress in the signal in the various iterations. The computation of these taps may be performed using any approach known in the art. This serial implementation of SIC functionality for CDMA 1500 may be repeated successively if desired and may be terminated using any of the criteria described within the FIG. 14.

Clearly, the resultant will be cleaner for successive iterations that are performed using the serial implementation of SIC functionality for CDMA 1500 as it will for performing multiple stages of the parallel implementation of SIC functionality for CDMA 1400. After the final iteration that is performed, the signal is passed to a despread functional block 1521 and to a slicer 1522 to generate the final output signal.

Alternatively, after the final iteration that is performed, the signal is passed to the despread functional block 1511 and to the slicer 1512 to generate the final output signal; this way the hardware within the IC functional block 1510 may be put to maximum use, and the despread functional block 1521 and the slicer 1522 would not be needed at all. Each of the despread functional block 1511 and 1521 may be viewed as being an output de-spread functional block, and each of the slicer 1512 and 1522 may be viewed as being an output slicer. It is also noted that a combination embodiment may include a portion of the parallel implementation of the FIG. 14 and a portion of the serial implementation of the FIG. 15 without departing from the scope and spirit of the invention.

The various embodiments described above within the FIGS. 14 and 15 may be viewed as those that are operable to deal with systems that are fully synchronized, in that, the received symbols are not undergoing any rotation at all. That is to say, these embodiments are operable to support SIC functionality for CDMA when no rotation correction and/or compensation needs to be performed. The potentially disastrous effects of rotation of received symbols is described using a nominal 30 degree rotation within a variety of constellation types employed within various modulations. As will be seen, rotation of the constellation's of lower order modulations may sometimes even be tolerated. However, as the number of constellation points of the higher order modulations continues to increase, then the fragility of the modulation becomes such that even relatively small amounts of rotation can prove disastrous when trying to make soft and hard decisions.

Figure 16:
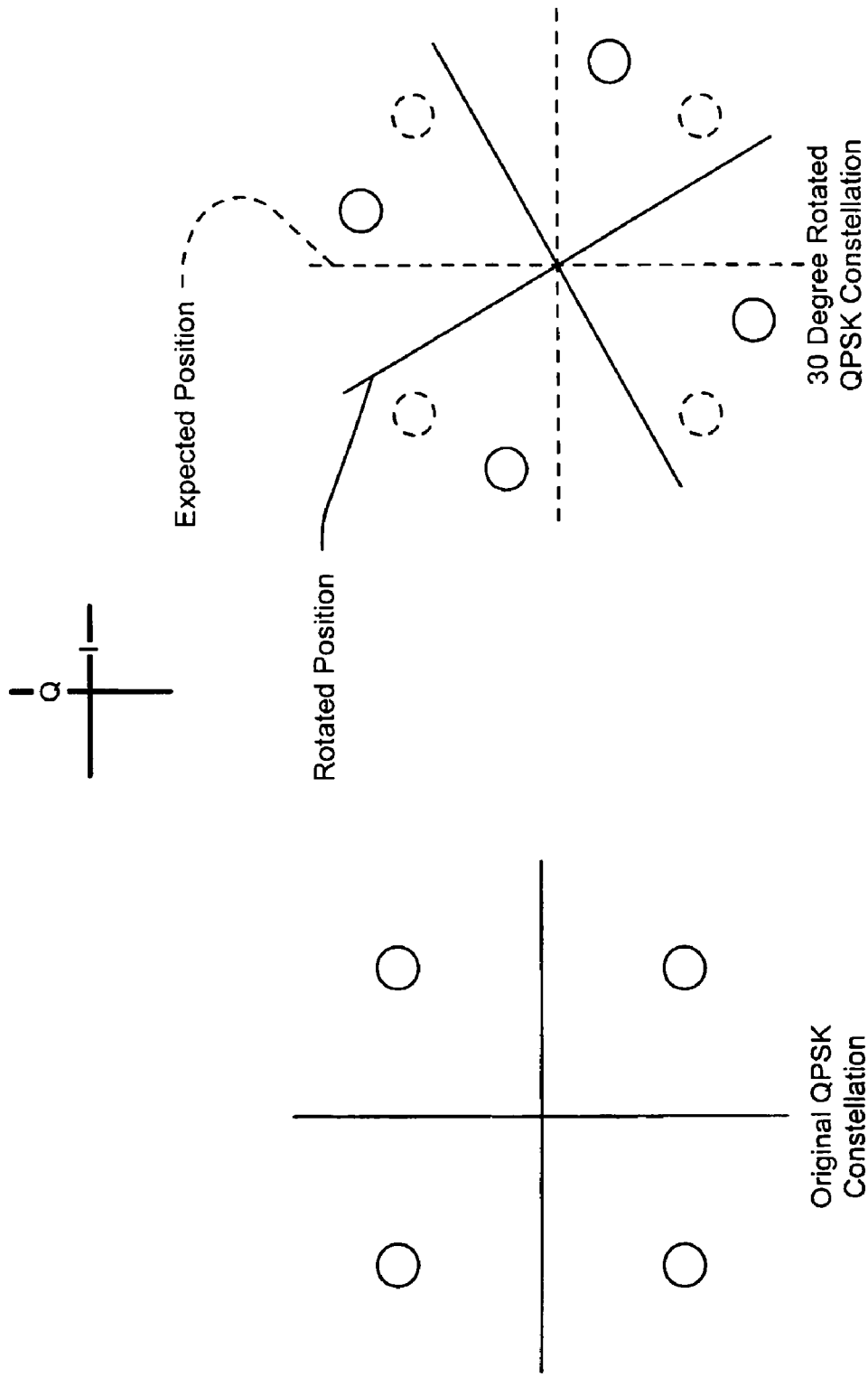
FIG. 16 is a diagram illustrating the effects of rotation on symbols coded using a constellation of QPSK (Quadrature Phase Shift Keying) modulation.

FIG. 16 is a diagram illustrating the effects of rotation on symbols coded using a constellation of QPSK (Quadrature Phase Shift Keying) modulation. On the left hand side, 4 constellation points of a QPSK modulation are shown as being aligned at 90 degree intervals with respect to the I,Q axes. On the right hand side, the 4 constellation points are shown after having undergone a nominal 30 degree rotation. As can been seen in this example, the constellation points still reside within their original quadrant. Within the QPSK modulation, given that only one constellation point is contained within each quadrant, then this particular modulation may accommodate relatively small degrees of rotation.

Figure 17:
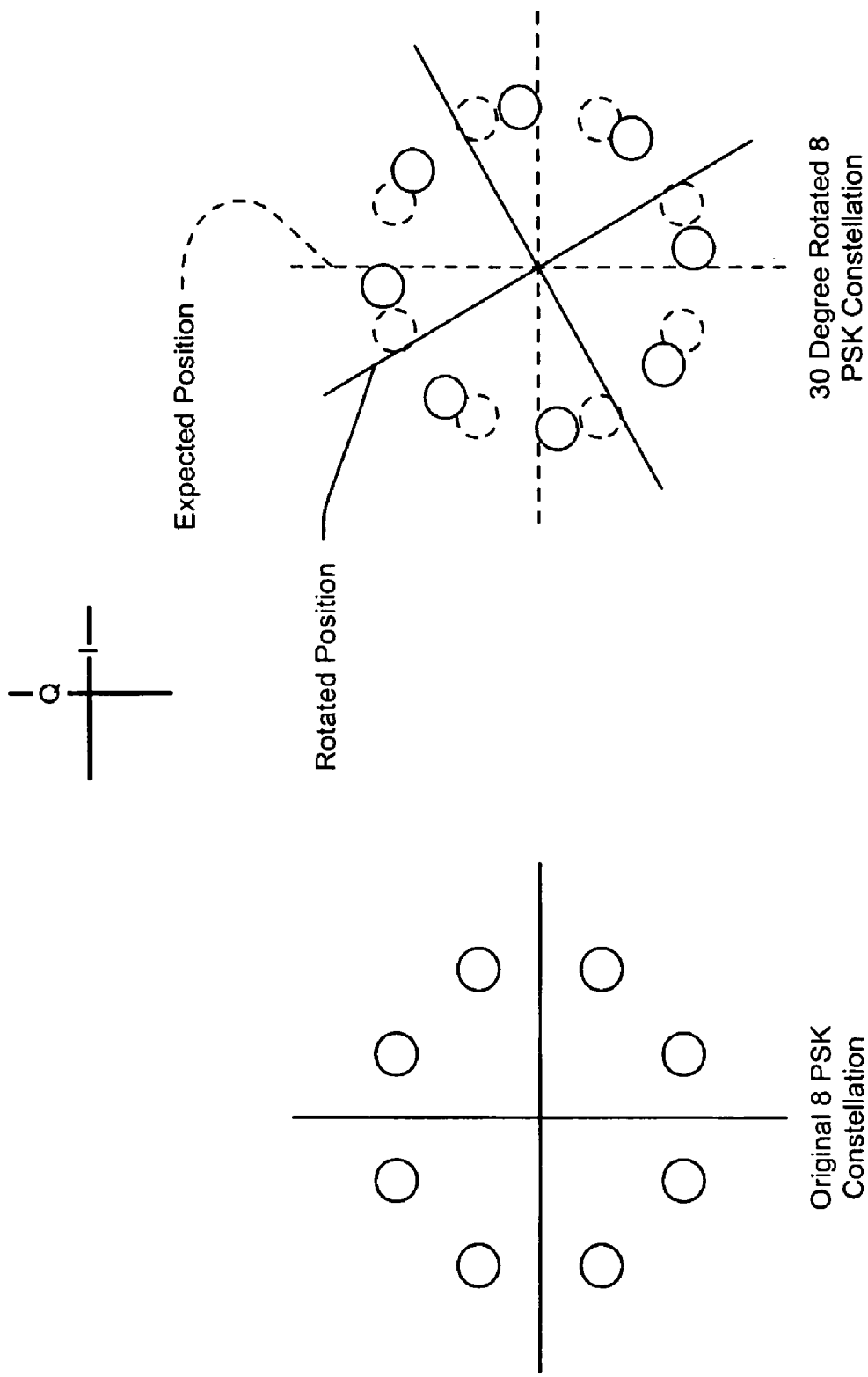
FIG. 17 is a diagram illustrating the effects of rotation on symbols coded using a constellation of 8 PSK (8 Phase Shift Keying) modulation.

FIG. 17 is a diagram illustrating the effects of rotation on symbols coded using a constellation of 8 PSK (8 Phase Shift Keying) modulation. On the left hand side, 8constellation points of an 8 PSK modulation are shown as being aligned at 45 degree intervals with respect to the I.O axes. On the right hand side the 8 constellation points are shown after having undergone a nominal 30 degree rotation. As can been seen in this example, some of the constellation points no longer reside within their original quadrant. Perhaps more problematic is the fact that some of the constellation points now nearly overlap with the positions of where other constellation points are expected to be located. In this situation, even a relatively small degree of rotation can be extremely problematic.

As the number of constellation points employed within the modulation continues to increase, the problems introduced by rotation continue to be exacerbated.

Figure 18:
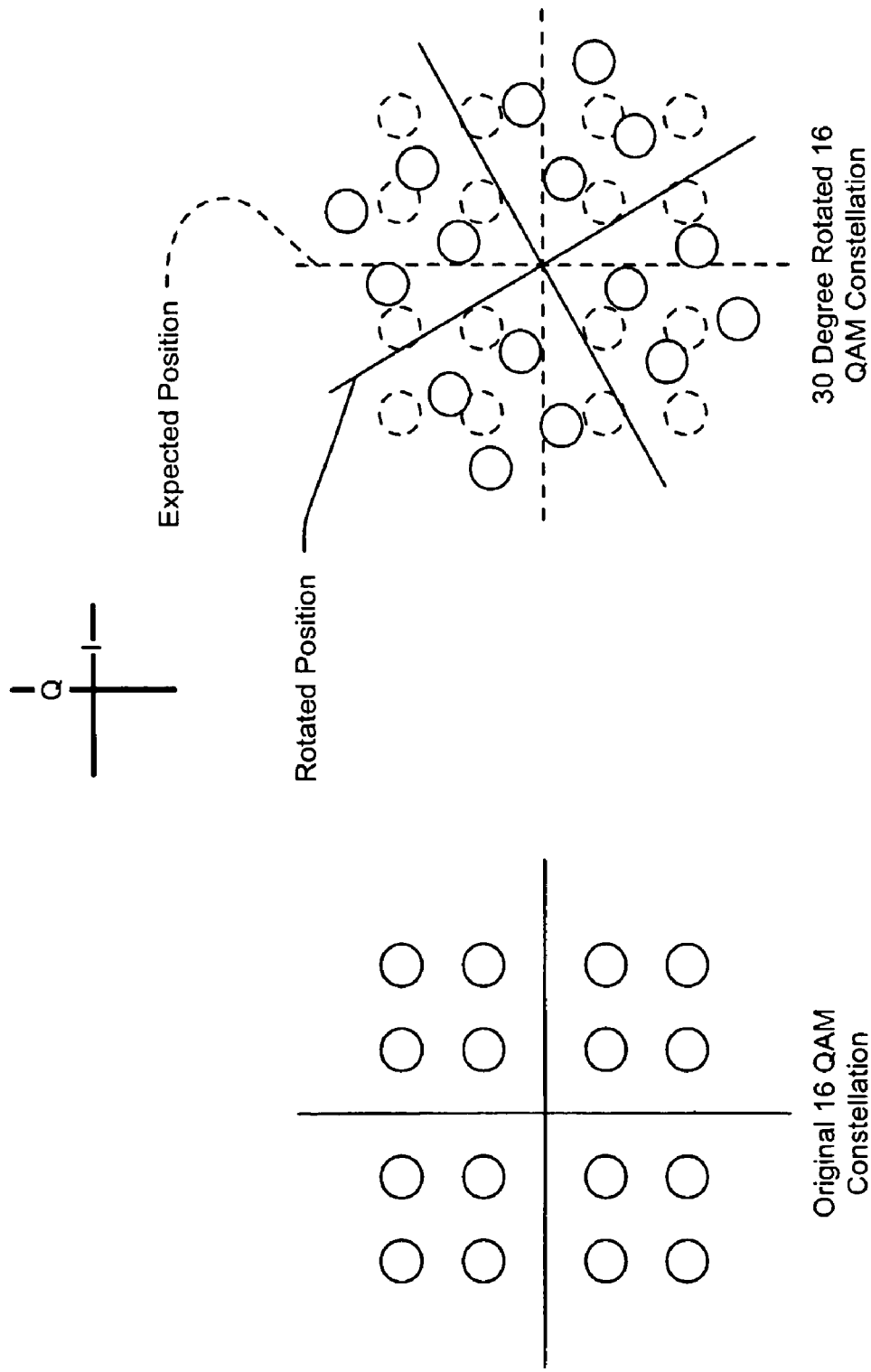
FIG. 18 is a diagram illustrating the effects of rotation on symbols coded using a constellation of 16 QAM (Quadrature Amplitude Modulation) modulation.

FIG. 18 is a diagram illustrating the effects of rotation on symbols coded using a constellation of 16 QAM (Quadrature Amplitude Modulation) modulation. On the left hand side, 16 constellation points of a 16 QAM modulation are shown as being aligned with respect to the I,Q axes. On the right hand side, the 16 constellation points are shown after having undergone a nominal 30 degree rotation. As can been seen in this example, some of the constellation points no longer reside within their original quadrant. Perhaps more problematic is the fact that several of the constellation points almost overlap with the positions of where other constellation points are expected to be located. Given that there are 16 constellation points involved, the negative effects introduced by the rotation are extreme. In this situation, even a relatively small degree of rotation is extremely problematic.

Figure 19:
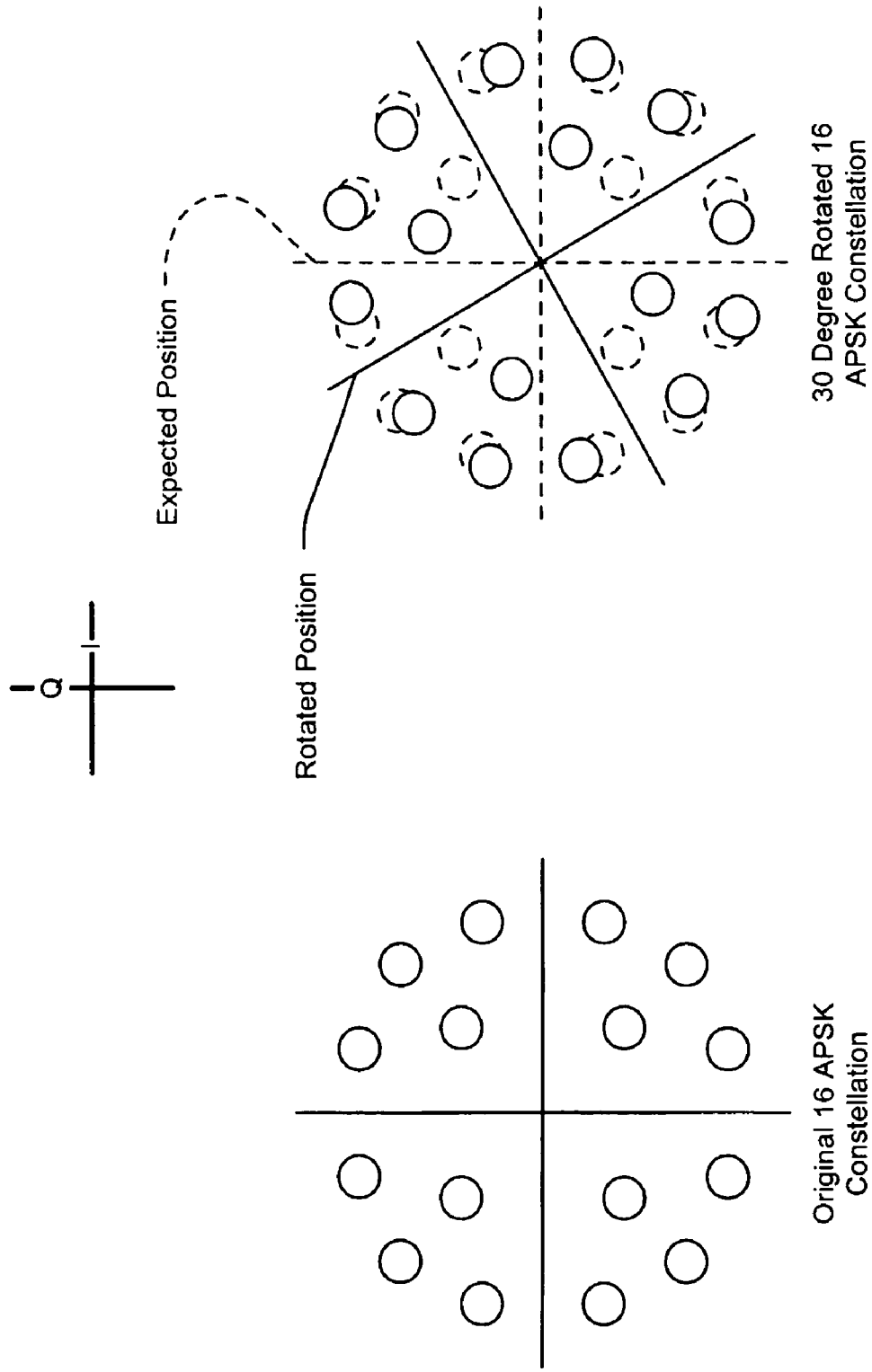
FIG. 19 is a diagram illustrating the effects of rotation on symbols coded using a constellation of 16 APSK (Amplitude Phase Shift Keying) modulation.

FIG. 19 is a diagram illustrating the effects of rotation on symbols coded using a constellation of 16 APSK (Amplitude Phase Shift Keying) modulation. On the left hand side, 16 constellation points of a 16 APSK modulation are shown as being aligned with respect to the I,Q axes. On the right hand side, the 16 constellation points are shown after having undergone a nominal 30 degree rotation. Again, as can been seen in this example, some of the constellation points no longer reside within their original quadrant. Similar to the 16 QAM example, perhaps more problematic is the fact that several of the constellation points almost overlap with the positions of where other constellation points are expected to be located. Also similar to the 16 QAM example, given that there are 16 constellation points involved, the negative effects introduced by the rotation are extreme. In this situation, even a relatively small degree of rotation is extremely problematic.

It is also understood that even higher order modulations will suffer even more greatly from the effects of rotation. For example, the degradation of performance of constellation points of a 256 QAM or 1024 QAM modulation could be even greater given that even more constellation points may nearly overlap and interfere with one another. Performing accurate soft and hard decisions will be virtually impossible.

Figure 20:
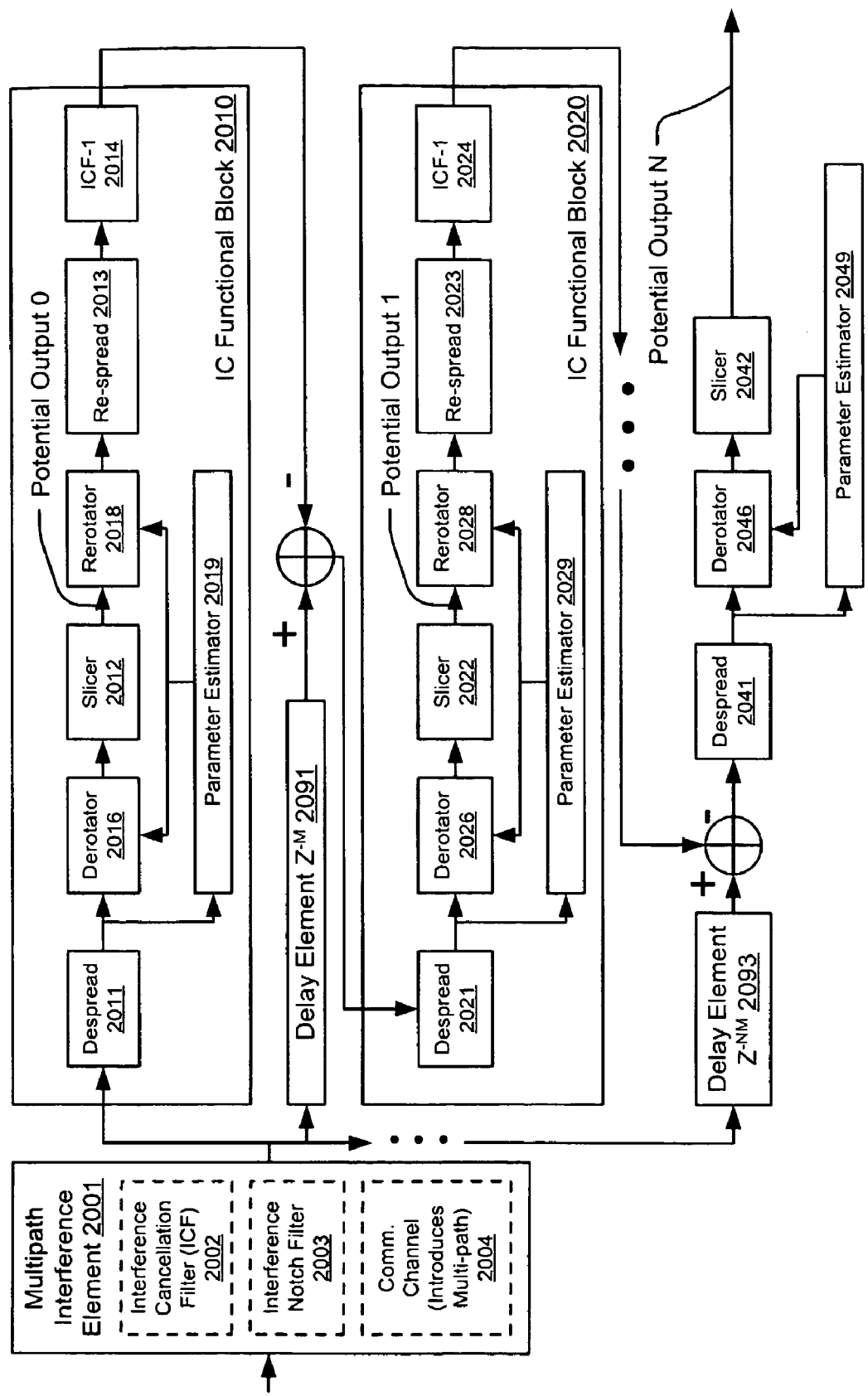
FIG. 20 is a functional block diagram illustrating an embodiment of successive interference canceling (SIC) functionality for CDMA that is arranged according to the invention in a parallel implementation that is operable to compensate for rotation.

FIG. 20 is a functional block diagram illustrating an embodiment of successive interference canceling (SIC) functionality for CDMA that is arranged according to the invention in a parallel implementation that is operable to compensate for rotation. In a block 2001, a spread signal is received from an element 2001 that has undesirably introduced multipath interference. This multipath interference may be caused by a variety of sources. For example, one source of the multipath interference may be from the effects of the communication channel itself as shown in a block 2004. However, other elements that may be employed to compensate for the existence of narrowband interference within a signal received by a communication receiver; sometimes, these introduced elements actually will introduce some degree of multipath interference. For example, some elements that are employed to minimize the effects of ingress and/or narrowband interference may include an interference cancellation filter (ICF) 2002 and/or an interference notch filter 2003. The multipath interference element 2001 may be viewed, at the very least, as being an element that introduces multi-path effects into the signal received by the SIC functionality for CDMA 2000. The attenuation of some of the component energy in the signals destroys the perfect orthogonality of the set of CDMA symbols, which results in ICI. In general, the ICF suppresses or "notch filters" portions of the frequency domain, which is intended to attenuate ingress, but also introduces ICI in the process.

The FIG. 20 shows a functional block diagram of the parallel implementation of the invention that is operable to compensate for rotation. In this approach, two or more successive interference canceling (SIC) stages are shown by the IC functional blocks, and each of those IC functional blocks is operable to compensate for rotation of the symbols within the received signal. The approach also employs a buffer of size M, which should be adequate to store the output of the ICF till despread, derotate, slice, rerotate, re-spread, and convolution operations are done. The ICF taps are chosen to notch out (or "blank") any present ingress in the signal. The computation of these taps may be performed using any approach known in the art.

For example, the signal output by the multipath interference element 2001 is simultaneously provided to an interference cancellation (IC) functional block 2010 and a delay element $Z^{-M}$ 2091. When multiple iterations of ICF are to performed using the SIC functionality for CDMA 2000, . . . the output of the multipath interference element 2001 is also simultaneously provided to a delay element $Z^{-(N-1)M}$ 2092 (when multiple iterations are performed), and to a delay element $Z^{-NM}$ 2092 (when N iterations are performed). The output of the IC functional block 2010 may be selected when there is no multipath interference in the received signal whatsoever. The IC functional block 2010 includes a despread functional block 2011, a slicer 2012, a re-spread functional block 2013, and an ICF-1 functional block 2014 (to perform convolution operations) according to the invention.; the ICF-1 functional blocks described herein may also be referred to as convolution functional blocks.

The despread functional block 2011 generates the soft decision of the received signal. The output of the despread functional block 2011 is simultaneously passed to a parameter estimator 2019 and a derotator 2016. The parameter estimator 2019 may employ preamble processing thereby using known and expected symbols to perform the rotation estimation of the received signal. Alternatively, the parameter estimator 2019 may also employ a portion of the payload (or data) of a received data segment as well. Once an actual estimation of the rotation is made, then the parameter estimator provides this rotation estimate to the derotator 2016. The derotator 2016 may include a buffer that matches the time period in which the parameter estimator 2019 takes to perform its estimation of the rotation within the signal. In addition, the parameter estimator provides this rotation estimate to the rerotator 2018 that is operable to add the rotation back into the signal, after slicing has been performed by the slicer 2012, for subsequent iterations of the SIC functionality for CDMA.

The slicer 2012 makes a hard decision based on the soft decision provided by the despread functional block 2011. These hard decisions by the slicer 2012 make the decisions offline with no cleaning of the signal; that is to say, without removing any ISI that exists among the chips. These hard decisions may include a number of errors that would be too significant within data applications, but they will give some accuracy of the received data even though there may be many error contained therein.

This initial estimate of the data is then passed to the rerotator 2018 and then this result is re-spread, in the functional block 2013, to reconstruct the chip level ISI. Then, the operation within the ICF-1 functional block 2014 generates the reconstructed ISI (on a chip level) of all of the other taps besides this first tap. This result may then be subtracted from the output of the delay element $Z^{-M}$ 2091. The delay length of the buffer, delay element $Z^{-M}$ 2091, is sufficient to match substantially the time required to perform the operations within each of the elements of the IC functional block 2010.

This chain of IC functionality, including parameter estimation directed derotation and rerotation, may be repeated successively if desired to provide for even further improved performance. For example, the output of the node (the first summing node) where the output of the delay element $Z^{-M}$ 2091 and the negative output of the IC functional block 2010 are summed together may be fed into an IC functional block 2020. The IC functional block 2020 will include comparable elements of the IC functional block 2010. For example, the IC functional block 2020 includes a despread functional block 2021 that generates soft decision of the output from the first summing node. Similarly, a parameter estimator 2029, a derotator 2026, and a rerotator 2028 all operate, in similar manner to the parameter estimator 2019, the derotator 2016, and the rerotator 2018 of the IC functional block 2010, to compensate for any rotation within the signal at this point within the processing.

After the signal passes through the derotator 2026, a slicer 2022 makes a hard decision based on the soft decision provided by the despread functional block 2021. These hard decisions by the slicer 2022 make the decisions offline with an improved, cleaner signal; that is to say, some of the ISI that exists among the chips will have been removed by the operations described above. These hard decisions will include a fewer number of errors than in the previous chain of IC functionality.

This next $2^{nd}$ order initial estimate of the data is then passed to the rerotator 2028 and then this result is then re-spread, in a functional block 2023, to reconstruct the chip level ISI (which will be reduced when compared to the previous chain).

Then, the operation within a ICF-1 functional block 2024 generates the reconstructed ISI (on a chip level) of all of the other taps besides this first tap; again, this reconstructed ISI will be relatively less than in the first chain. This result may then be subtracted from the output of a delay element $Z^{-(N-1)M}$ 2092. The delay length of the buffer, delay element $Z^{-(N-1)M}$ 2092, is sufficient to match substantially the time required to perform the operations within each of the elements of the IC functional block 2010, within each of the elements of the IC functional block 2020, and any additional IC functional blocks that are employed.

It is noted that the resultant output of the slicer 2012 within the IC functional block 2010 may be selected as an output. Alternatively, the resultant output of the slicer 2022 within the IC functional block 2020 may be selected as an output when it has been determined that a solution has been reached (say when a difference between potential output 0 and potential output 1 are within a predetermined degree of magnitude). Alternatively, this potential output 1 may be selected when a predetermined number of chains (2 in such an embodiment) are selected to be performed. Another method of determining when to end this process is to look at the Signal to Noise Ratio (SNR) of the signal and to select the output from one of the stages when the SNR meets a predetermined threshold.

Subsequent chains may be implemented successively as desired to provide even further performance. For example, multiple chains may be included up to perform even additional SIC functionality for CDMA according to the invention.

After the final iteration, the output of the IC functional block 2020 is subtracted from the output of the delay element $Z^{-NM}$ 2093 whose delay is sufficient to match substantially the time required to perform the operations within each of the elements of the IC functional blocks 2010, 2020, ..., and any other IC functional blocks. This signal is de-spread using the de-spread functional block 2041 to generate soft decisions. This result is then passed simultaneously to a parameter estimator 2049 and a derotator 2046. The output from the derotator 2046 is then passed to a slicer 2042 to generate hard decisions there from; the de-spread functional block 2041, along with the parameter estimator 2049 and the derotator 2046, may be viewed as being the output processing functional blocks associated with the slicer 2042 to generate an output, namely, the potential output N.

The parallel implementation of the SIC functionality for CDMA 2000 may be preferable in an application where hardware is not significantly limited by given design and compensating for rotation in the received signal is a design criteria or consideration. Other designs, where hardware is much more constrained, or more expensive than hardware, may benefit from a serial implementation described below in FIG. 21 that is also operable to perform derotation and rerotation.

Figure 21:
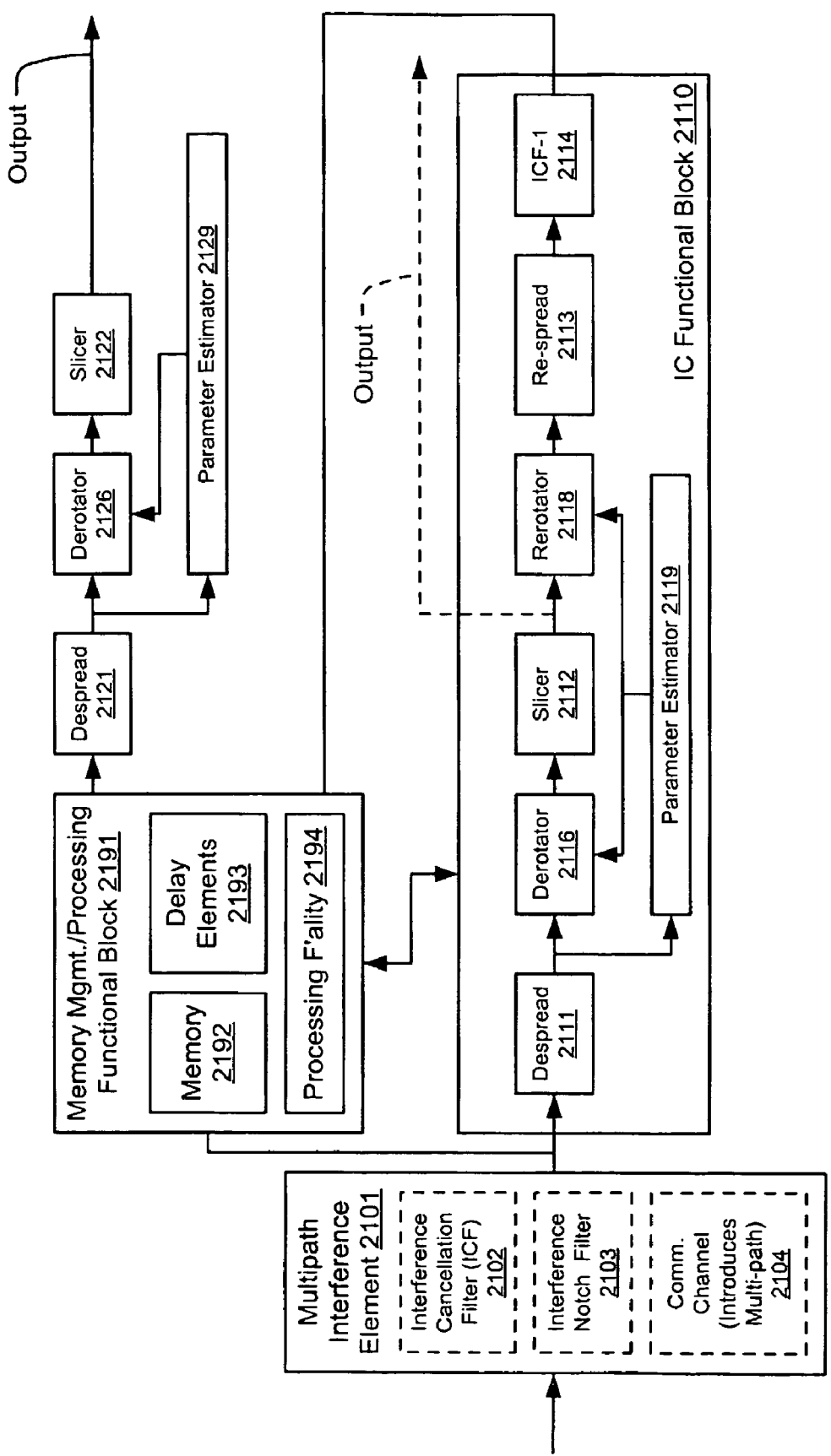
FIG. 21 is a functional block diagram illustrating an embodiment of SIC functionality for CDMA that is arranged according to the invention in a serial implementation that is operable to compensate for rotation.

FIG. 21 is a functional block diagram illustrating an embodiment of SIC functionality for CDMA that is arranged according to the invention in a serial implementation that is operable to compensate for rotation. In a block 2101, a spread signal is received from an element 2101 that has undesirably introduced multipath interference. This multipath interference may be caused by a variety of sources. For example, one source of the multipath interference may be from the effects of the communication channel itself as shown in a block 2104. However, other elements that may be employed to compensate for the existence of narrowband interference within a signal received by a communication receiver; sometimes, these introduced elements actually will introduce some degree of multipath interference. For example, some elements that are employed to minimize the effects of ingress and/or narrowband interference may include an interference cancellation filter (ICF) 2102 and/or an interference notch filter 2103. The multipath interference element 2101 may be viewed, at the very least, as being an element that introduces multi-path effects into the signal received by the SIC functionality for CDMA 2100. The attenuation of some of the component energy in the signals destroys the perfect orthogonality of the set of CDMA symbols, which results in ICI. In general, the ICF suppresses or "notch filters" portions of the frequency domain, which is intended to attenuate ingress, but also introduces ICI in the process.

The FIG. 21 shows a functional block diagram of the serial implementation of the invention that is operable to compensate for rotation. In this approach, a single successive interference canceling (SIC) stage is shown by an IC functional block 2110. The IC functional block 2110 is implemented in such a way that it may be used over and over again. The FIG. 21 shows an embodiment where a single IC functional block is employed. Clearly, two IC functional blocks could also be employed in a ping-pong embodiment as well without departing from the scope and spirit of the invention.

For example, the signal output by the multipath interference element 2101 is provided to the IC functional block 2110. The output of the IC functional block 2110 (after passing through only once) may be selected when there is no multipath interference in the received signal whatsoever. The IC functional block 2110 includes a despread functional block 2111, a parameter estimator 2119, a derotator 2116, a slicer 2112, a rerotator 2118, a re-spread functional block 2113, and an ICF-1 functional block 2114 (to perform convolution operations) according to the invention. The elements within the IC functional block 2110 operate cooperatively in a similar fashion to the IC functional blocks within the FIG. 20.

The despread functional block 2111 generates the soft decision of the received signal. The output of the despread functional block 2111 is simultaneously provided to the parameter estimator 2119 and the derotator 2116. The slicer 2112 makes a hard decision based on the soft decision provided by the derotator 2116 after having passed through the despread functional block 2111. These hard decisions by the slicer 2112 may be made offline with no cleaning of the signal; that is to say without removing any ISI that exists among the chips. These hard decisions may include a number of errors that would be too significant within data applications, but they will give some accuracy of the received data even though there may be many error contained therein. This initial estimate of the data is passed to the rerotator 2118 and then this result is then re-spread, in the functional block 2113, to reconstruct the chip level ISI. Then, the operation within the ICF-1 functional block 2114 generates the reconstructed ISI (on a chip level) of all of the other taps besides this first tap.

This result (after passing through the IC functional block 2110 one time) may then be provided to a memory management/processing functional block 2191. The original signal, received from the multipath interference element 2101 has also been stored in a memory 2192 of the memory management/processing functional block 2191 where it has been buffered properly using delay elements 2193. The memory management/processing functional block 2191 is also operable to transfer and buffer subsequent interference cancelled versions of the signal as well. Herein, the output from the IC functional block 2110 (after passing through one time) is subtracted from the buffered and delayed version of the original signal using processing functionality 2194; the delay length of the buffer would be $Z^{-M}$ that is sufficient to match substantially the time required to perform the operations within each of the elements of the IC functional block 2110. Multiple, and if desired selectable, delay elements within the delay elements 2193 may be used to perform provide buffering and delaying of the various versions stored therein. The memory management/processing functional block 2191 operates in conjunction with the IC functional block 2110 to perform one, two, . . . , or more iterations of SIC functionality for CDMA using the IC functional block 2110 multiple times.

The memory management/processing functional block 2191 is operable to perform buffering (of various sizes M, 2M, . . . , and (N−1)M, NM), which should be adequate to store the output of the ICF till despread, derotated, slice, rerotated, re-spread, and convolution operations are done in subsequent iterations. The ICF taps of the ICF-1 functional block 2114 are chosen to notch out any present ingress in the signal in the various iterations. The computation of these taps may be performed using any approach known in the art. This serial implementation of SIC functionality for CDMA 2100 may be repeated successively if desired and may be terminated using any of the criteria described within the FIG. 20.

Clearly, the resultant will be cleaner for successive iterations that are performed using the serial implementation of SIC functionality for CDMA 2100 as it will for performing multiple stages of the parallel implementation of SIC functionality for CDMA 2000 that is also operable to correct for rotation. After the final iteration that is performed, the signal is passed to a despread functional block 2121, to a parameter estimator 2129 and a derotator 2126, and then to a slicer 2122 to generate the final output signal.

Alternatively, after the final iteration that is performed, the signal is passed to the despread functional block 2111, to the derotator 2116, and to the slicer 2112 to generate the final output signal; this way the hardware within the IC functional block 2110 may be put to maximum use, and the despread functional block 2121 and the slicer 2122 would not be needed at all. Each of the de-spread functional block 2111/derotator 2116 and the de-spread functional block 2121/derotator 2126 may be viewed as being the output functional blocks that operate cooperatively with the slicers 2112 and 2122 to generate the final potential outputs. It is also noted that a combination embodiment may include a portion of the parallel implementation of the FIG. 20 and a portion of the serial implementation of the FIG. 21 without departing from the scope and spirit of the invention.

The various embodiments described above within the FIGS. 20 and 21 may be viewed as those that are operable to deal with systems that are not fully synchronized, in that, the received symbols may actually have undergone some rotation. That is to say, these embodiments are operable to support SIC functionality for CDMA when rotation correction and/or compensation may need to be performed.

Figure 22:
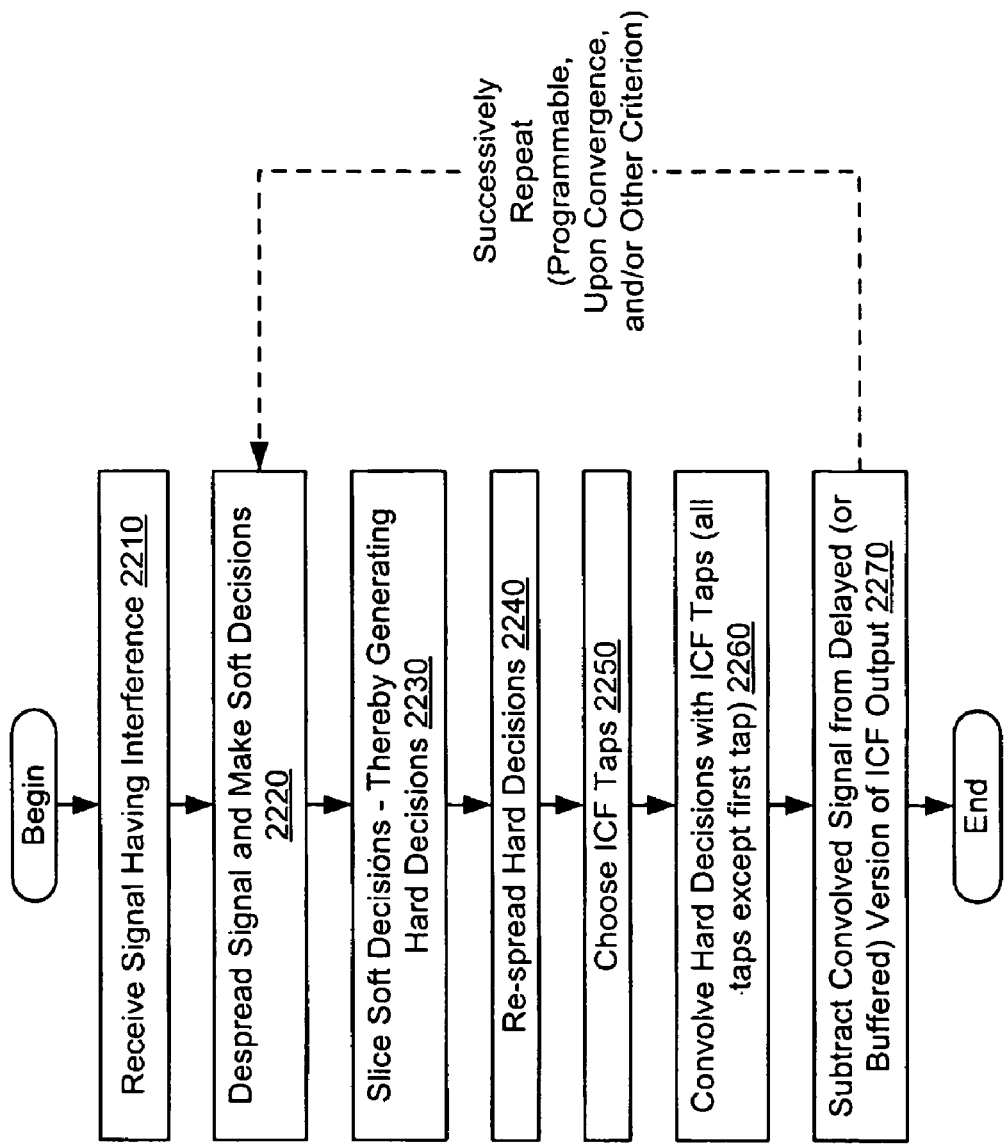
FIG. 22 is an operational flow diagram illustrating an embodiment of an SIC method for CDMA that is performed according to the invention.

FIG. 22 is an operational flow diagram illustrating an embodiment of an SIC method for CDMA 2200 that is performed according to the invention. In a block 2210, a signal is received that has some degree of interference contained therein. In a block 2220, the signal is despread and soft decisions are made of the despread signal. These soft decisions are sliced as shown in a block 2230 thereby generating hard decisions. Clearly, some of these hard decisions may include some errors, given that no SIC functionality for CDMA has yet to be made on the signal. Then, in a block 2240, these hard decisions are re-spread. The ICF taps of an ICF are chosen in a block 2250, using any manner known in the art, that will subsequently be used to convolve the hard decisions (all except the first tap) as shown in a block 2260. This convolved signal, output of an ICF-1 functional block, is then subtracted from the buffered and delayed version of the original signal as shown in a block 2270.

This process may be performed successively. The SIC method for CDMA 2200 may terminate when it has been determined that a solution has been reached (say when a difference between one iteration and a subsequent iteration are within a predetermined degree of magnitude). Alternatively, a predetermined number of iterations may be performed in every case (this number of iterations may be selectable and programmable). Another method of determining when to end this process is to look at the Signal to Noise Ratio (SNR) of the signal and to select the output from one of the stages when the SNR meets a predetermined threshold.

Figure 24:
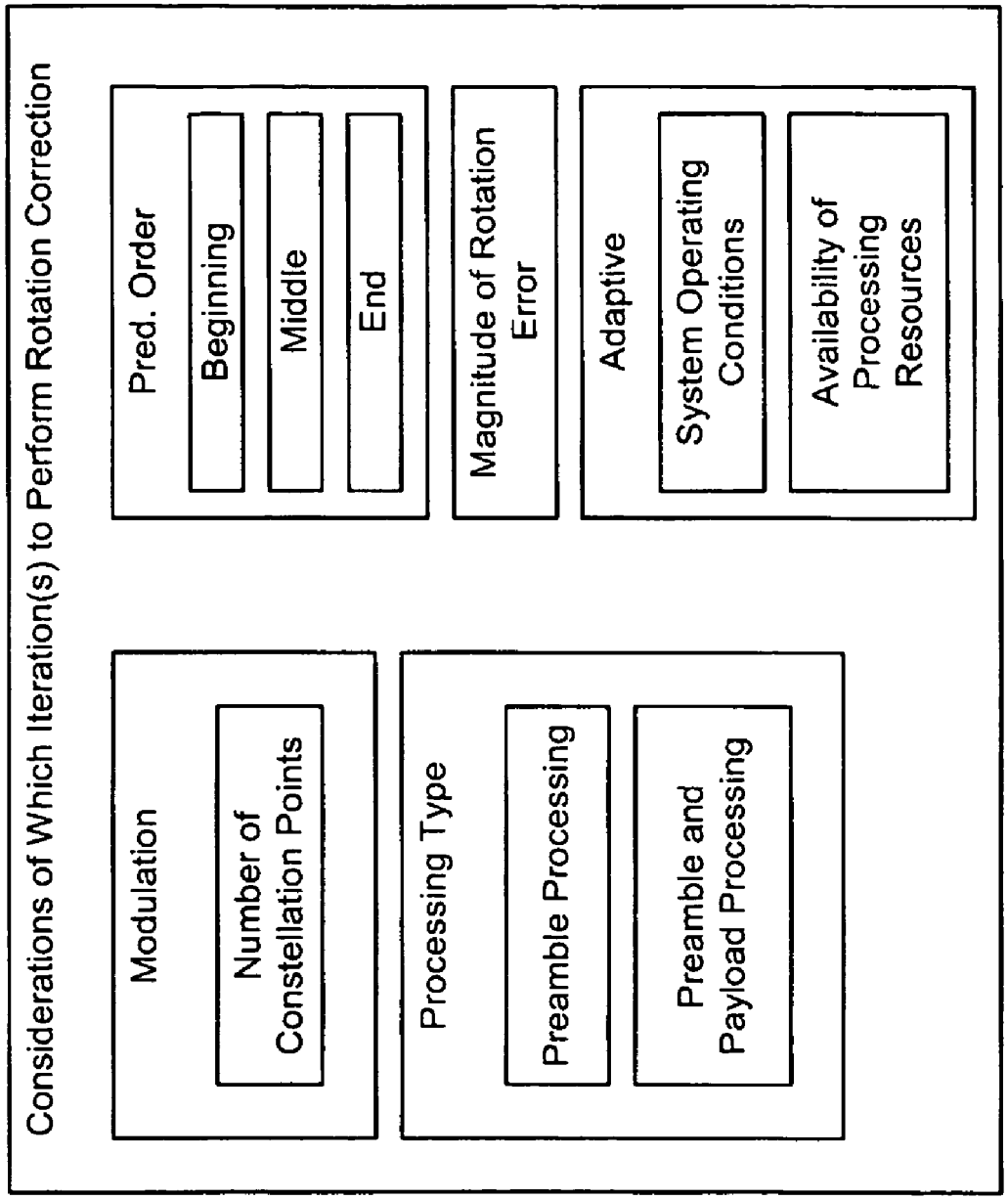
FIG. 24 is a diagram illustrating a number of considerations of which iteration(s) to perform rotation correction according to the invention.

After the total number of iterations has been performed according to the FIG. 24, the final output signal is then despread thereby generating soft decisions and sliced to generate the final output hard decisions. This may be performed using any of the various embodiments described herein.

Figure 23:
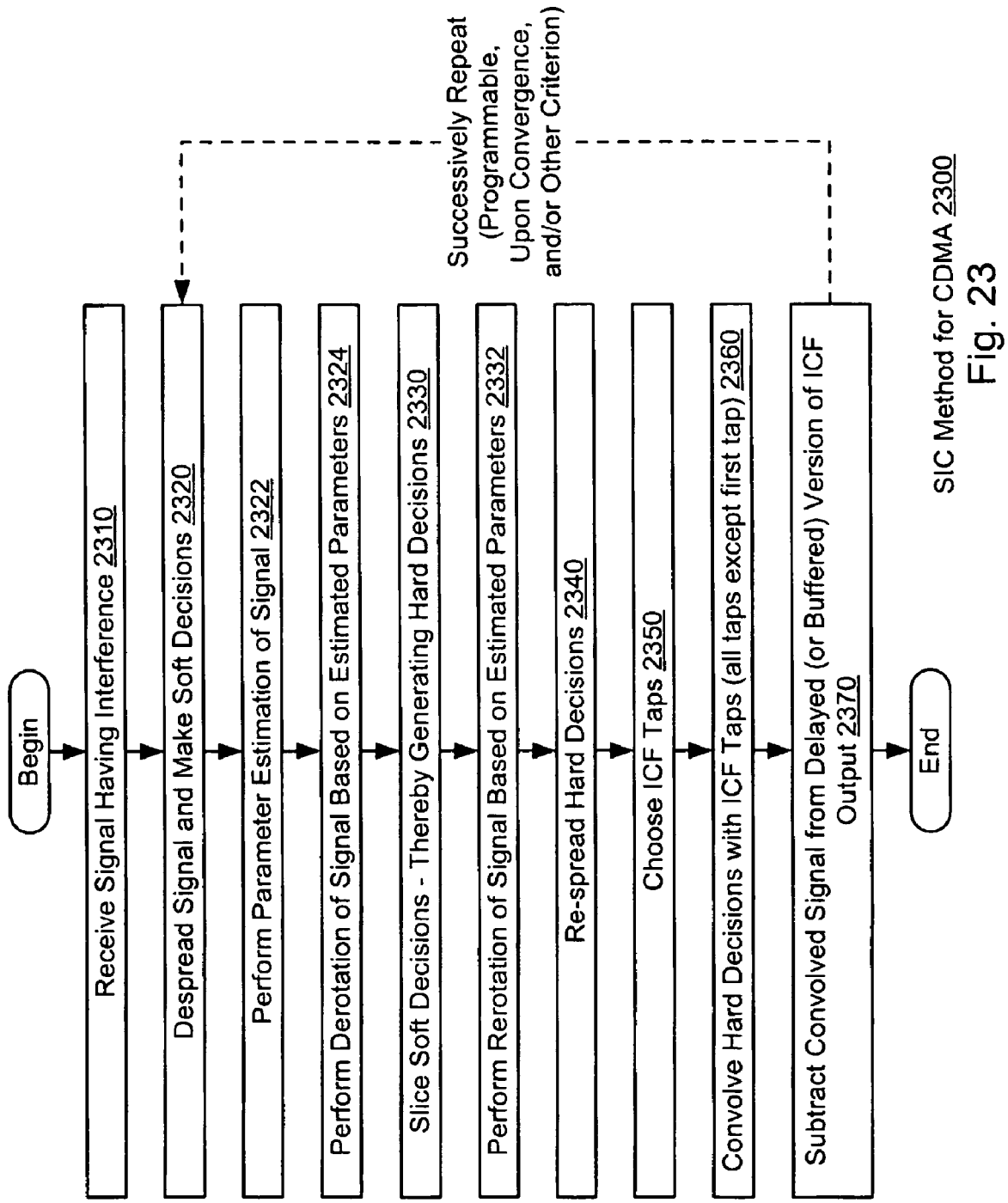
FIG. 23 is an operational flow diagram illustrating another embodiment of an SIC method for CDMA that is performed according to the invention.

FIG. 23 is an operational flow diagram illustrating another embodiment of an SIC method for CDMA 2300 that is performed according to the invention. In a block 2310, a signal is received that has some degree of interference contained therein. In a block 2220, the signal is despread and soft decisions are made of the despread signal. In a block 2322, parameter estimation is made on this signal in an effort to estimate the rotation of the symbols within the received signal. This may be performed using preamble processing in certain embodiments. Alternatively, this may be performed using a portion of the payload (or data) of a received data segment as well. After the estimate of the rotation is made, then any rotation within the signal is then derotated as shown in a block 2324. Then, this result then undergoes slicing as shown in a block 2230 thereby generating hard decisions. In some embodiments, the signal at this point is taken as the final output signal. However, it is noted that some of these hard decisions may include some errors, given that no SIC functionality for CDMA has yet to be made on the signal. However, within embodiments that do not take the signal at this point as the final output and where multiple iterations are performed, any rotation that has been derotated is then rerotated back into the signal at this point as shown in a block 2332.

Then, in a block 2340, these hard decisions, that do include any rotation having been rerotated back in, are re-spread. The ICF taps of an ICF are chosen in a block 2350, using any manner known in the art, that will subsequently be used to convolve the hard decisions (all except the first tap) as shown in a block 2360. This convolved signal, output of an ICF-1 functional block, is then subtracted from the buffered and delayed version of the original signal as shown in a block 2370.

This process may be performed successively. The SIC method for CDMA 2300 may terminate when it has been determined that a solution has been reached (say when a difference between one iteration and a subsequent iteration are within a predetermined degree of magnitude). Alternatively, a predetermined number of iterations may be performed in every case (this number of iterations may be selectable and programmable). Another method of determining when to end this process is to look at the Signal to Noise Ratio (SNR) of the signal and to select the output from one of the stages when the SNR meets a predetermined threshold.

After the total number of iterations has been performed according to the FIG. 23, the final output signal is then despread thereby generating soft decisions and sliced to generate the final output hard decisions. This may be performed using any of the various embodiments described herein.

FIG. 24 is a diagram illustrating a number of considerations of which iteration(s) to perform rotation correction according to the invention. One determination may be made based on the type of modulation that is employed. For example, those modulations that employ fewer numbers of constellation points may not need as much rotation correction, if any at all, as those that employ higher numbers of constellation points.

Another consideration may be based on what processing type is employed to perform rotation estimation. For example, some embodiments may employ preamble processing that employs only the preamble symbols of a received signal. Other embodiments may employ both the preamble and any payload as well. There may be a system may not include sufficient processing resources to perform preamble and payload processing every time. Within some iterations, the system may perform rotation correction, but it may not in all of the iterations.

Yet another consideration may be based on a predetermined order of which iterations should undergo rotation correction. For example, some embodiments perform rotation correction at every iteration including the beginning, the middle, and the end. Other embodiments will perform rotation correction only at the beginning, or only at the end.

Yet another consideration is the magnitude of the rotation error. When the magnitude exceeds a particular threshold, then the rotation correction may be performed according to the invention. When the magnitude does not exceed that particular threshold, then the rotation correction need not be performed according to the invention. In addition, the consideration may be adaptive in nature. This may involve considering either one or both of the system operating conditions and the availability of processing resources that may be capable to perform the rotation correction.

Figure 25:
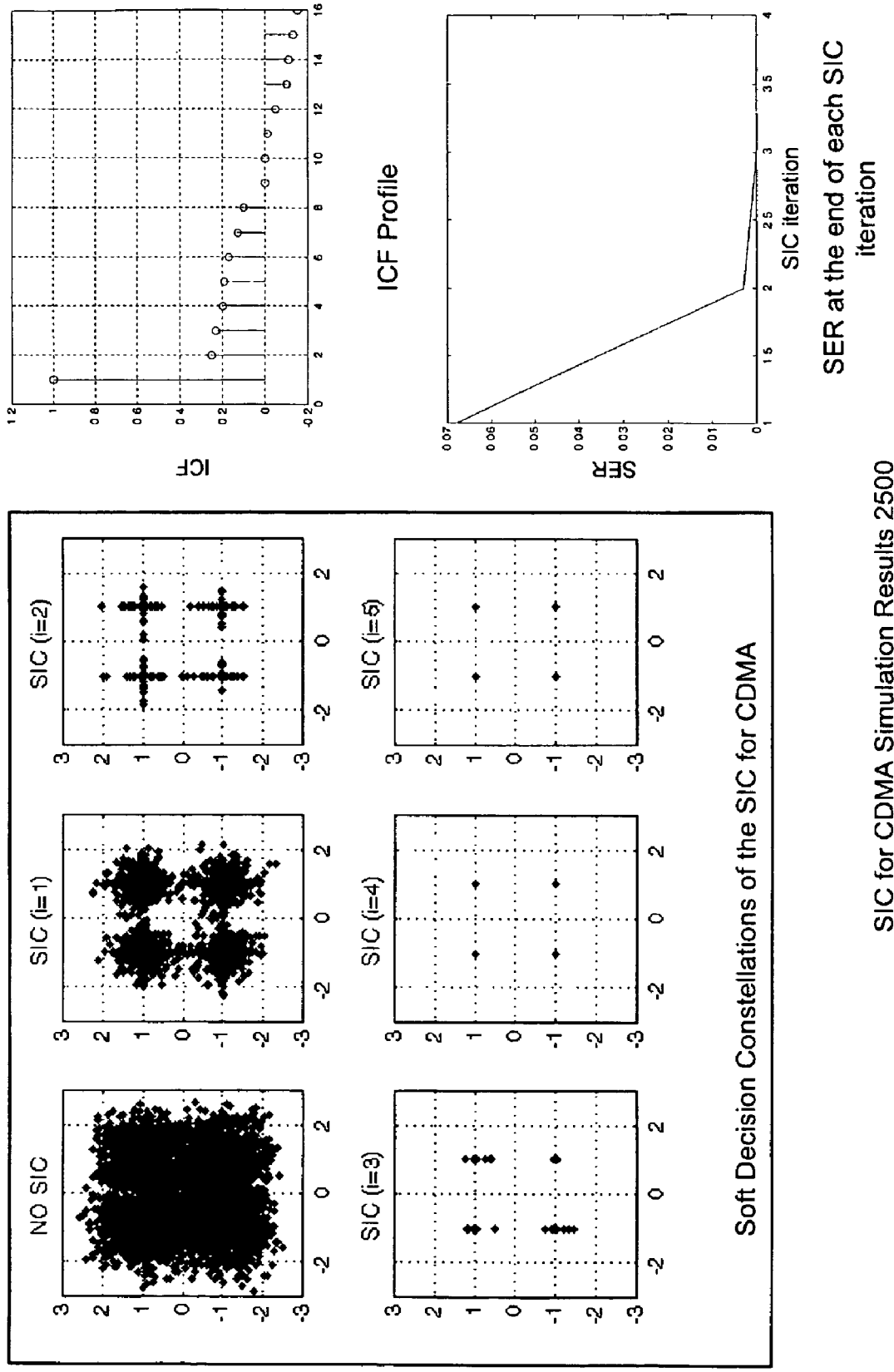
FIG. 25 shows an embodiment of SIC for CDMA simulation results according to the invention.

FIG. 25 shows an embodiment of SIC for CDMA simulation results according to the invention. The FIG. 25 show simulation results for despreader output constellations of three SIC iterations in an SCDMA system with 120 active codes and QPSK (Quadrature Phase Shift Keying) modulation, which uses an ICF whose tap magnitudes are shown in the upper right hand side of FIG. 25. The lower right hand side of FIG. 25 shows the hard decision SER versus the SIC iteration (i=0, for no SIC, and when i=1, 2, 3, 4, and 5). The FIG. 25 show that the SIC procedure according to the invention converges, in this case, in 3 iterations. Again, the number of iterations to be performed may be selected appropriately for the given situation. The number of iterations may be predetermined, it may be determined based upon convergence of the constellation points, and/or it may be determined by looking at some measured such as SNR in the received signal after having undergone various iterations of SIC for CDMA.

In view of the above detailed description of the invention and associated drawings, other modifications and variations will now become apparent. It should also be apparent that such other modifications and variations may be effected without departing from the spirit and scope of the invention.

What is claimed is:

1. A communication device, comprising:
an interference cancellation filter that is operable to reduce ingress or narrowband interference within a signal thereby generating a filtered signal, wherein the interference cancellation filter generates inter-code interference within the signal; and
an interference cancellation functional block is operable to de-spread, slice, re-spread, and convolve the filtered signal thereby generating a convolved signal, wherein the convolution of the signal is operable to reproduce the inter-code interference generated by the interference cancellation filter; and wherein:
the convolved signal is combined with the filtered signal thereby generating a cleaned signal.

2. The communication device of claim 1, further comprising:
an output de-spread functional block that is operable to generate a plurality of output soft decisions from the cleaned signal; and
an output slicer that is operable to generate a plurality of output hard decisions using the plurality of output soft decisions.

3. The communication device of claim 1, further comprising:
a delay element that is operable to delay the filtered signal for a period of time substantially matching a time the filtered signal is processed within the interference cancellation functional block; and wherein:
the convolved signal is subtracted from a delayed output signal that is provided from the delay element thereby generating the cleaned signal.

4. The communication device of claim 1, wherein:
the interference cancellation filter employs a selected plurality of interference cancellation filter taps to notch out ingress or narrowband interference within the signal thereby generating the filtered signal.

5. The communication device of claim 1, wherein:
the interference cancellation functional block includes a de-spread functional block, a slicer, a re-spread functional block, and a convolution functional block;
the de-spread functional block is operable to de-spread the filtered signal thereby generating a de-spread signal;
the slicer is operable to slice the de-spread signal thereby generating a sliced signal;
the re-spread functional block is operable to re-spread the sliced signal thereby generating a re-spread signal; and
the convolution functional block is operable to convolve the re-spread signal, that involves reproducing the inter-code interference generated by the interference cancellation filter, thereby generating the convolved signal.

6. The communication device of claim 1, wherein:
the signal is launched into a communication channel by at least one additional communication device;
the communication device is operable to receive the signal from the communication channel;
before launching the signal into the communication channel, the at least one additional communication device maps a symbol to a constellation point within a constellation;
as the signal is transmitted from the at least one additional communication device to the communication device via the communication channel, the signal is affected such that the symbol undergoes rotation with respect to the constellation to which it is mapped; and
the communication device includes a derotator that is operable to compensate for the rotation.

7. The communication device of claim 1, wherein:
the communication device includes a derotator that is operable to compensate for any rotation of a constellation to which a symbol of the signal is mapped; and
the constellation includes a plurality of constellation points.

8. The communication device of claim 1, wherein:
the interference cancellation functional block includes a convolution functional block;

the convolution functional block is operable to estimate the inter-code interference generated by the interference cancellation filter; and the convolution functional block is operable to convolve the re-spread signal, that involves reproducing at least some of the inter-code interference generated by the interference cancellation filter, thereby generating the convolved signal.

9. The communication device of claim 1, further comprising:

at least one additional interference cancellation functional block is operable to de-spread, slice, re-spread, and convolve the cleaned signal thereby generating at least one additional convolved signal; and wherein:

the at least one additional convolved signal is combined with the filtered signal thereby generating at least one additional cleaned signal.

10. The communication device of claim 1, further comprising:

at least one additional interference cancellation functional block is operable to de-spread, slice, re-spread, and convolve the cleaned signal thereby generating at least one additional convolved signal; and wherein:

the at least one additional convolved signal is combined with the filtered signal thereby generating at least one additional cleaned signal;

the communication device is operable to compare the cleaned signal and the at least one additional cleaned signal; and the communication device selects either the cleaned signal or the at least one additional cleaned signal based on a difference between the cleaned signal and the at least one additional cleaned signal.

11. The communication device of claim 1, wherein:
the communication device is implemented within a wireless communication system.

12. A communication device, comprising:

an interference cancellation filter that is operable to reduce ingress or narrowband interference within a signal thereby generating a filtered signal, wherein the interference cancellation filter generates inter-code interference within the signal; and an interference cancellation functional block includes a de-spread functional block, a derotator, a slicer, a rerotator, a re-spread functional block, and a convolution functional block; and wherein:

the de-spread functional block is operable to de-spread the filtered signal thereby generating a de-spread signal;

the derotator is operable to operable to compensate for any rotation of a constellation to which a symbol of the signal is mapped thereby generating a derotated signal;

the slicer is operable to slice the derotated signal thereby generating a sliced signal;

the rerotator is operable to operable to reintroduce the rotation of the constellation into the sliced signal thereby generating a rerotated signal;

the re-spread functional block is operable to re-spread the rerotated signal thereby generating a re-spread signal;

the convolution functional block is operable to convolve the re-spread signal to reproduce the inter-code interference generated by the interference cancellation filter thereby generating a convolved signal; and the convolved signal is combined with the filtered signal thereby generating a cleaned signal.

13. The communication device of claim 12, further comprising:

a parameter estimator that is operable to estimate any rotation of the constellation to which the symbol of the signal is mapped.

14. The communication device of claim 12, further comprising:

at least one additional interference cancellation functional block is operable to de-spread, derotate, slice, rerotate, re-spread, and convolve the cleaned signal thereby generating at least one additional convolved signal; and wherein:

the at least one additional convolved signal is combined with the filtered signal thereby generating at least one additional cleaned signal.

15. The communication device of claim 12, further comprising:

at least one additional interference cancellation functional block is operable to de-spread, derotate, slice, rerotate, re-spread, and convolve the cleaned signal thereby generating at least one additional convolved signal; and wherein:

the at least one additional convolved signal is combined with the filtered signal thereby generating at least one additional cleaned signal;

the communication device is operable to compare the cleaned signal and the at least one additional cleaned signal; and the communication device selects either the cleaned signal or the at least one additional cleaned signal based on a difference between the cleaned signal and the at least one additional cleaned signal.

16. The communication device of claim 12, wherein:
the communication device is implemented within a wireless communication system.

17. A method for performing interference cancellation within a signal, the method comprising:

employing an interference cancellation filter to filter a signal to reduce ingress or narrowband interference within the signal thereby generating a filtered signal, wherein the filtering generates inter-code interference within the signal;

de-spreading the filtered signal thereby generating a de-spread signal;

slicing the de-spread signal thereby generating a sliced signal;

re-spreading the sliced signal thereby generating a re-spread signal;

convolving the re-spread signal, that includes reproducing the inter-code interference generated by the interference cancellation filter, thereby generating a convolved signal; and combining with the filtered signal thereby generating a cleaned signal.

18. The method of claim 17, further comprising:
generating a plurality of output soft decisions from the cleaned signal; and
slicing the plurality of output soft decisions thereby generating a plurality of output hard decisions.

19. The method of claim 17, further comprising:
compensating for any rotation of a constellation to which a symbol of the signal is mapped.

20. The method of claim 17, wherein:
the method is performed within a communication device; and
the communication device is implemented within a wireless communication system.

* * * * *